(12) United States Patent
Ottlik et al.

(10) Patent No.: US 9,639,760 B2
(45) Date of Patent: May 2, 2017

(54) METHODS AND APPARATUS FOR ESTABLISHING EXIT/ENTRY CRITERIA FOR A SECURE LOCATION

(75) Inventors: Artur Ottlik, Duluth, GA (US); Jeffrey Bragg, Marietta, GA (US); Lloyd Strine, Roswell, GA (US)

(73) Assignee: SIEMENS SCHWEIZ AG, Zürich (CH)

( * ) Notice: Subject to any disclaimer, the term of this patent is extended or adjusted under 35 U.S.C. 154(b) by 62 days.

(21) Appl. No.: 14/427,567

(22) PCT Filed: Sep. 7, 2012

(86) PCT No.: PCT/US2012/054158
§ 371 (c)(1),
(2), (4) Date: Apr. 24, 2015

(87) PCT Pub. No.: WO2014/039050
PCT Pub. Date: Mar. 13, 2014

(65) Prior Publication Data
US 2015/0242691 A1    Aug. 27, 2015

(51) Int. Cl.
*G06K 9/00* (2006.01)
*G06K 9/46* (2006.01)
(Continued)

(52) U.S. Cl.
CPC ............ *G06K 9/00711* (2013.01); *G06K 9/46* (2013.01); *G06K 9/52* (2013.01); *G08B 13/196* (2013.01);
(Continued)

(58) Field of Classification Search
None
See application file for complete search history.

(56) References Cited

U.S. PATENT DOCUMENTS

| | | |
|---|---|---|
| 4,249,207 A | 2/1981 | Harman et al. |
| 4,257,063 A | 3/1981 | Loughry et al. |

(Continued)

FOREIGN PATENT DOCUMENTS

| | | |
|---|---|---|
| EP | 1400939 A4 | 3/2004 |
| EP | 1835472 A2 | 9/2007 |

(Continued)

OTHER PUBLICATIONS

Snidaro et al., "Video Security for Ambient Intelligence", IEEE, vol. 35, No. 1, Jan. 2005, pp. 133-144. (12 pages).

(Continued)

*Primary Examiner* — Shervin Nakhjavan

(57) ABSTRACT

In some embodiments, a method of monitoring a secure location is provided that includes (1) providing one or more sensors that monitor the secure location, each sensor generating sensor data; (2) establishing a policy region for the secure location employing world coordinates, the policy region establishing one or more alarm criterion for at least one of objects entering the policy region and objects exiting the policy region; (3) tracking an object within the secure location using the sensor data from the one or more sensors; and (4) determining if the sensor data indicates that the object has violated one or more alarm criterion of the policy region. Numerous other embodiments are provided.

21 Claims, 19 Drawing Sheets

(51) Int. Cl.
*G06K 9/52* (2006.01)
*H04N 7/18* (2006.01)
*G08B 13/196* (2006.01)

(52) U.S. Cl.
CPC ......... *G08B 13/19652* (2013.01); *H04N 7/18* (2013.01); *G06K 2009/4666* (2013.01); *G08B 13/19613* (2013.01); *G08B 13/19682* (2013.01)

(56) References Cited

U.S. PATENT DOCUMENTS

| | | | |
|---|---|---|---|
| 4,839,631 A | 6/1989 | Tsuji | |
| 6,127,926 A * | 10/2000 | Dando | G08B 13/2491 340/522 |
| 6,970,083 B2 | 11/2005 | Venetianer et al. | |
| 7,183,907 B2 | 2/2007 | Simon et al. | |
| 7,319,479 B1 | 1/2008 | Crabtree et al. | |
| 7,822,275 B2 | 10/2010 | Rasheed et al. | |
| 7,868,912 B2 | 1/2011 | Venetianer et al. | |
| 7,886,648 B2 | 2/2011 | Williams et al. | |
| 7,932,923 B2 | 4/2011 | Lipton et al. | |
| 7,956,890 B2 | 6/2011 | Cheng et al. | |
| 8,049,658 B1 | 11/2011 | Lagonik et al. | |
| 8,087,335 B2 | 1/2012 | Shekarri | |
| 8,107,677 B2 | 1/2012 | Angell et al. | |
| 8,149,113 B2 | 4/2012 | Diem | |
| 2004/0161133 A1 * | 8/2004 | Elazar | G01S 3/7864 382/115 |
| 2004/0240542 A1 * | 12/2004 | Yeredor | G06K 9/00771 375/240.01 |
| 2005/0024208 A1 * | 2/2005 | Maki | G08B 13/2497 340/545.3 |
| 2005/0093697 A1 * | 5/2005 | Nichani | G06K 9/00778 340/545.1 |
| 2005/0105764 A1 | 5/2005 | Han et al. | |
| 2005/0157169 A1 | 7/2005 | Brodsky et al. | |
| 2005/0162515 A1 | 7/2005 | Venetianer et al. | |
| 2005/0200453 A1 * | 9/2005 | Turner | G07C 9/00087 340/5.61 |
| 2005/0249382 A1 * | 11/2005 | Schwab | G06K 9/00778 382/115 |
| 2006/0226971 A1 * | 10/2006 | Petricoin | G08B 29/188 340/517 |
| 2006/0284050 A1 * | 12/2006 | Busse | G01J 1/4228 250/203.1 |
| 2007/0013776 A1 | 1/2007 | Venetianer et al. | |
| 2007/0058717 A1 | 3/2007 | Chosak et al. | |
| 2007/0273518 A1 * | 11/2007 | Lupoli | G06Q 10/08 340/572.1 |
| 2007/0285510 A1 | 12/2007 | Lipton et al. | |
| 2008/0030579 A1 | 2/2008 | Kelly, III et al. | |
| 2008/0100704 A1 * | 5/2008 | Venetianer | G06F 17/3079 348/143 |
| 2008/0258907 A1 | 10/2008 | Kalpaxis | |
| 2009/0060278 A1 | 3/2009 | Hassan-Shafique et al. | |
| 2009/0158367 A1 | 6/2009 | Myers et al. | |
| 2009/0167857 A1 * | 7/2009 | Matsuda | G07C 9/00 348/143 |
| 2009/0216587 A1 | 8/2009 | Dwivedi et al. | |
| 2010/0026802 A1 | 2/2010 | Titus et al. | |
| 2010/0053330 A1 * | 3/2010 | Hellickson | G01S 17/023 348/153 |
| 2010/0194859 A1 | 8/2010 | Heigl | |
| 2011/0007139 A1 | 1/2011 | Brunetti | |
| 2011/0228094 A1 | 9/2011 | Cheng et al. | |
| 2011/0304458 A1 * | 12/2011 | Sayegh | G08B 13/248 340/568.8 |
| 2012/0188081 A1 * | 7/2012 | Van Katwijk | G01S 13/56 340/541 |
| 2016/0275766 A1 * | 9/2016 | Venetianer | G06F 17/3079 |

FOREIGN PATENT DOCUMENTS

| | | |
|---|---|---|
| EP | 2120452 A1 | 11/2009 |
| GB | 2482127 A | 1/2012 |
| WO | 9313508 A1 | 7/1993 |
| WO | 9417503 A1 | 8/1994 |
| WO | 2008/094029 A1 | 8/2008 |
| WO | 2011/004358 A1 | 1/2011 |

OTHER PUBLICATIONS

Rossi et al., "Tracking and Counting Moving People", IEEE, 1994, pp. 212-216. (5 pages).
Grimson et al., "Using Adaptive Tracking to Classify and Monitor Activities in a Site", IEEE, 1998, pp. 22-29. (8 pages).
Johnson et al., "Learning the Distribution of Object Trajectories for Event Recognition", British Machine Vision Conference. (10 pages).
Koller et al., "Towards Robust Automatic Traffic Scene Analysis in Real-Time", Computer Science Division, University of California, Berkeley. (6 pages).
Khoudour et al., "Real-time Pedestrian Counting by Active Linear Cameras", Journal of Electronic Imaging, 5(4), Oct. 1996, pp. 452-459. (8 pages).
Wren et al., "Pfinder: Real-Time Tracking of the Human Body", IEEE, vol. 19, No. 7, Jul. 1997, pp. 780-785. (6 pages).
Lipton et al., "Moving Target Classification and Tracking from Real-time Video", IEEE, 1998, pp. 8-14. (7 pages).
Green et al., "The Detection and Quantification of Persons in Cluttered Beach Scenes Using Neural Network-Based Classification", School of Information and Communication Technology, Griffith Centre for Coastal Mgnmt, Griffith University, Australia. (6 pages).
Siemens Brochure, "Siveillance SiteIQ Wide Area—protect your sited from a single point", http://www.siemens.com/siveillance-siteiq, 2012. (4 pages).
Siemens Brochure, "Siveillance SiteIQ Wide Area—protect your airport on one screen", http://siemens.com/siveillance-siteiq 2011. (4 pages).
PCT Search Report dated Jun. 10, 2013, for application No. PCT/US2012/054158. (9 pages).

* cited by examiner

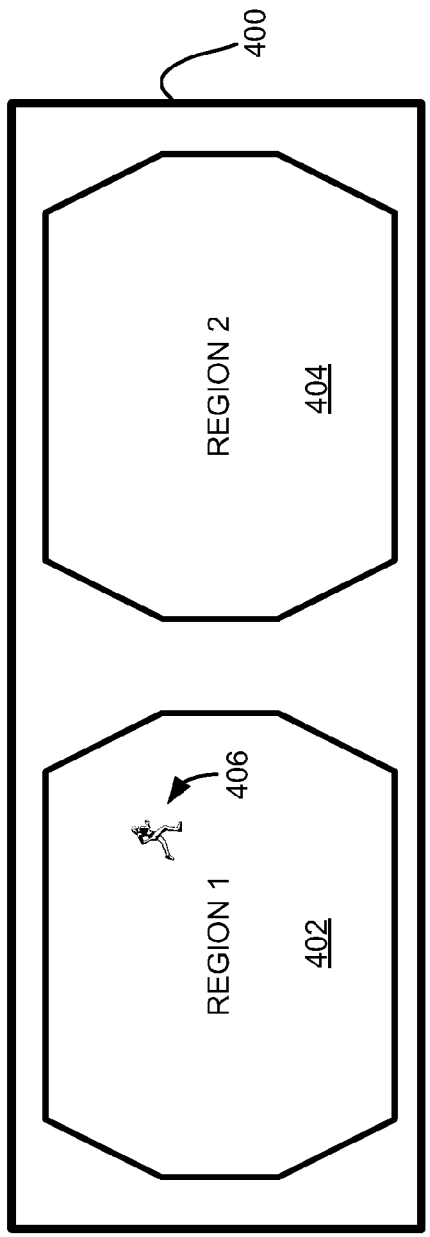
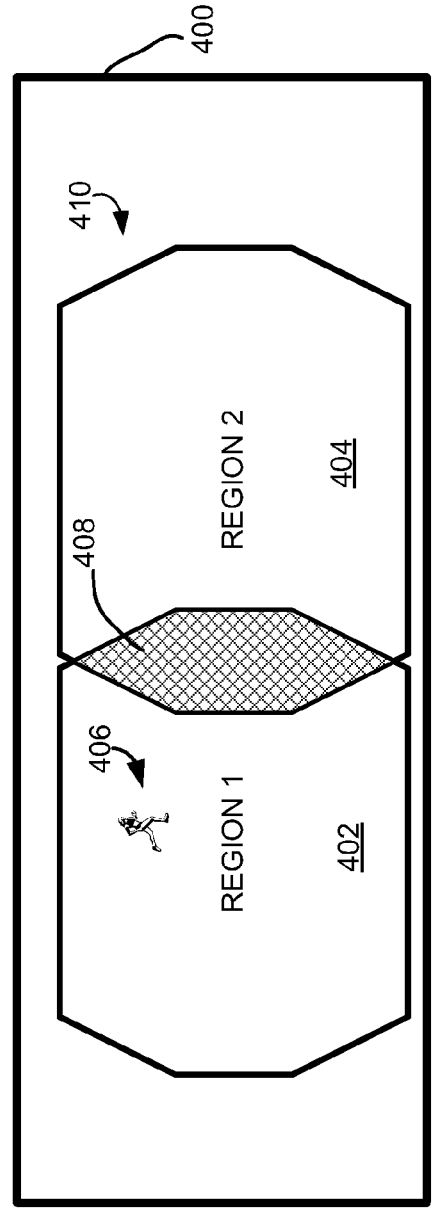

METHODS AND APPARATUS FOR ESTABLISHING EXIT/ENTRY CRITERIA FOR A SECURE LOCATION

FIELD OF THE INVENTION

The present invention generally relates to security and surveillance systems, and more specifically to methods and apparatus for establishing exit/entry criteria for a secure location.

BACKGROUND OF THE INVENTION

Surveillance systems may be employed to secure locations such as airports, parking lots, warehouse facilities, or the like. Typically such systems employ cameras to identify and track activities within a location to be secured. For example, cameras may be employed to detect unauthorized access by a person or vehicle within a location.

Most surveillance systems are capable of generating an alarm condition based on the presence of a target object (hereinafter "object") within a region being monitored. Whenever the object is present anywhere within the monitored region, an alarm condition is generated. These camera-based surveillance systems generally provide little flexibility for a user to establish and tailor alarm criteria within a portion of a secure location, particularly at entry, exit or other boundary locations. As such, improved methods and apparatus for establishing exit/entry criteria for a secure location are needed.

SUMMARY OF THE INVENTION

In some embodiments, a method of monitoring a secure location is provided that includes (1) providing one or more sensors that monitor the secure location, each sensor generating sensor data; (2) establishing a policy region for the secure location employing world coordinates, the policy region establishing one or more alarm criterion for at least one of objects entering the policy region and objects exiting the policy region; (3) tracking an object within the secure location using the sensor data from the one or more sensors; and (4) determining if the sensor data indicates that the object has violated one or more alarm criterion of the policy region.

In some embodiments, a system for monitoring a secure location is provided that includes (a) one or more sensors that monitor the secure location, each sensor generating sensor data; and (b) a controller coupled to the one or more sensors and configured to (1) receive sensor data from the one or more sensors; (2) allow a user to establish a policy region for the secure location employing world coordinates, the policy region establishing one or more alarm criterion for at least one of objects entering the policy region and objects exiting the policy region; (3) track an object within the secure location using the received sensor data; and (4) determining if the received sensor data indicates that the object has violated the one or more alarm criterion of the policy region.

In some embodiments, a method of monitoring a secure location is provided that includes (1) providing one or more sensors that monitor the secure location, each sensor generating pixel data; (2) establishing a polygon-shaped policy region for the secure location employing world coordinates, the policy region establishing one or more alarm criterion for at least one of objects entering the policy region and objects exiting the policy region; (3) converting pixel data from the one or more sensors to world coordinate sensor data; (4) tracking a position of an object within the secure location using the world coordinate sensor data; (5) determining if the world coordinate sensor data indicates that the object has violated one or more alarm criterion of the policy region; and (6) triggering an alarm if the world coordinate sensor data indicates that the object has violated one or more alarm criterion of the policy region.

In some embodiments, a system for monitoring a secure location is provided that includes (a) one or more sensors that monitor the secure location, each sensor generating world coordinate sensor data; and (b) a controller coupled to the one or more sensors and configured to (1) allow a user to establish a polygon-shaped policy region for the secure location employing world coordinates, the policy region establishing one or more alarm criterion for at least one of objects entering the policy region and objects exiting the policy region; (2) track a position of an object within the secure location using the world coordinate sensor data; (3) determine if the world coordinate sensor data indicates that the object has violated one or more alarm criterion of the policy region; and (4) trigger an alarm if the world coordinate sensor data indicates that the object has violated the one or more alarm criterion of the policy region.

Numerous other aspects are provided. Other features and aspects of the present invention will become more fully apparent from the following detailed description, the appended claims and the accompanying drawings.

BRIEF DESCRIPTION OF THE DRAWINGS

FIGS. 4A-4D are schematic illustrations of example embodiments of a secure location which employs multiple policy regions in accordance with embodiments of the present invention.

DETAILED DESCRIPTION

Embodiments of the present invention allow flexible "policy regions" to be established within a secure location.

These flexible policy regions may be configured with custom alarm criteria so that alarms are triggered only when user specified conditions are met. For example, it may be desirable to only generate an alarm when an object first enters a secure location and not while the object moves within or exits the secure location. It also may be desirable to allow an object to enter a secure location from a specific "safe entry" location such as a guard house, a check-in facility or the like without triggering an alarm.

In some embodiments of the invention, a policy region may be established in which an alarm is triggered only when an object enters the policy region, but not when the object moves within or exits the policy region. In other embodiments, a policy region may be established in which an alarm is triggered only when an object exits a policy region, but not when the object enters or moves within the policy region. In yet other embodiments, a policy region may be established in which an alarm is triggered only when an object enters or exits the policy region, but not while the object moves within the policy region. Further, in some embodiments, a policy region may be established in which an alarm is triggered only when an object enters or exits the policy region for a predetermined time, distance, direction or other data point. Other policy region configurations/alarm criteria may be provided.

Policy regions of any shape, size and/or number may be established within a secure location. In some embodiments, a policy region may take the form of a polygon such as a triangle, square, rectangle, quadrilateral, pentagon, hexagon, or any other similar closed shape specified by a user.

Different policy regions may have the same or different alarm criteria. Policy regions may be combined and/or overlapped to form composite policy regions. As will be described further below, overlapping policy regions may have alarm criteria that are different than the alarm criteria of the individual policy regions which overlap. In some embodiments, overlapping policy regions may be employed to create "safe entry" regions within a secure location that allow objects to enter the secure location without triggering an alarm.

In one or more embodiments, an object may be detected by a sensor such as a camera, radar, a GPS device, etc., and the object's position may be established, monitored and tracked in world coordinates (e.g., the Universal Transverse Mercator (UTM) coordinate system or another suitable coordinate system). Policy regions may be established within the same world coordinate system, without regard to the particular sensor(s) being employed. These and other aspects of the invention are described below with reference to FIG. 1A-13.

Figure 1A:
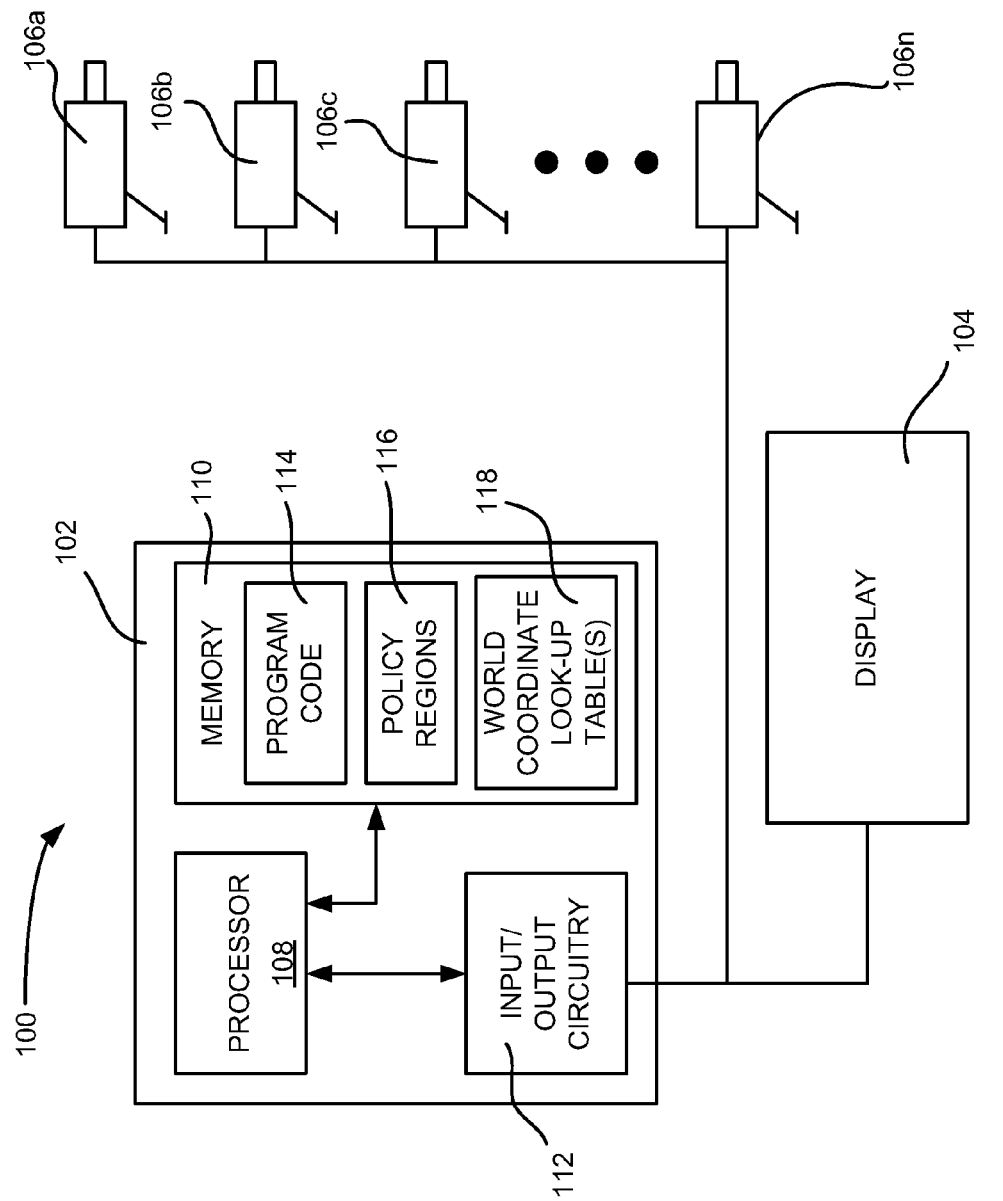
FIG. 1A is a schematic illustration of a surveillance system provided in accordance with embodiments of the present invention.

FIG. 1A is a schematic illustration of a surveillance system 100 provided in accordance with embodiments of the present invention. The surveillance system 100 includes a controller 102 coupled to a display 104 and to one or more sensors 106a-n.

The controller 102 may include a processor 108 such as a microcontroller, microprocessor, application specific integrated circuit, programmable logic controller, any combination of the above, or the like, coupled to a memory 110 and input/output circuitry 112. The memory 110 may include any suitable memory, such as random access memory (RAM), solid state memory, a hard drive, etc. In some embodiments, the memory 110 includes program code 114 for controlling operation of the surveillance system 100 and/or performing one or more of the methods described herein, policy region definitions 116 that define the size, shape and/or behavior of one or more policy regions of the surveillance system 100, and one or more world coordinate look-up tables or databases 118 that facilitate conversion of object locations from sensor positions to a world coordinate system and vice versa (as described further below). The memory 110 may include other data, program code and/or databases. Further, in some embodiments, one or more of the components of the controller 102 may be distributed amongst multiple computer systems and/or servers, whether local or remote from one another.

The display 104 may include any suitable display for displaying sensor images, policy regions, overall site or secure location images and/or representations, etc. The sensors 106a-n may include one or more cameras, radar devices, global positioning system (GPS) tracking devices, automatic identification system (AIS) tracking devices, automatic dependent surveillance-broadcast (ADSB) tracking devices, or other sensors.

Figure 1B:
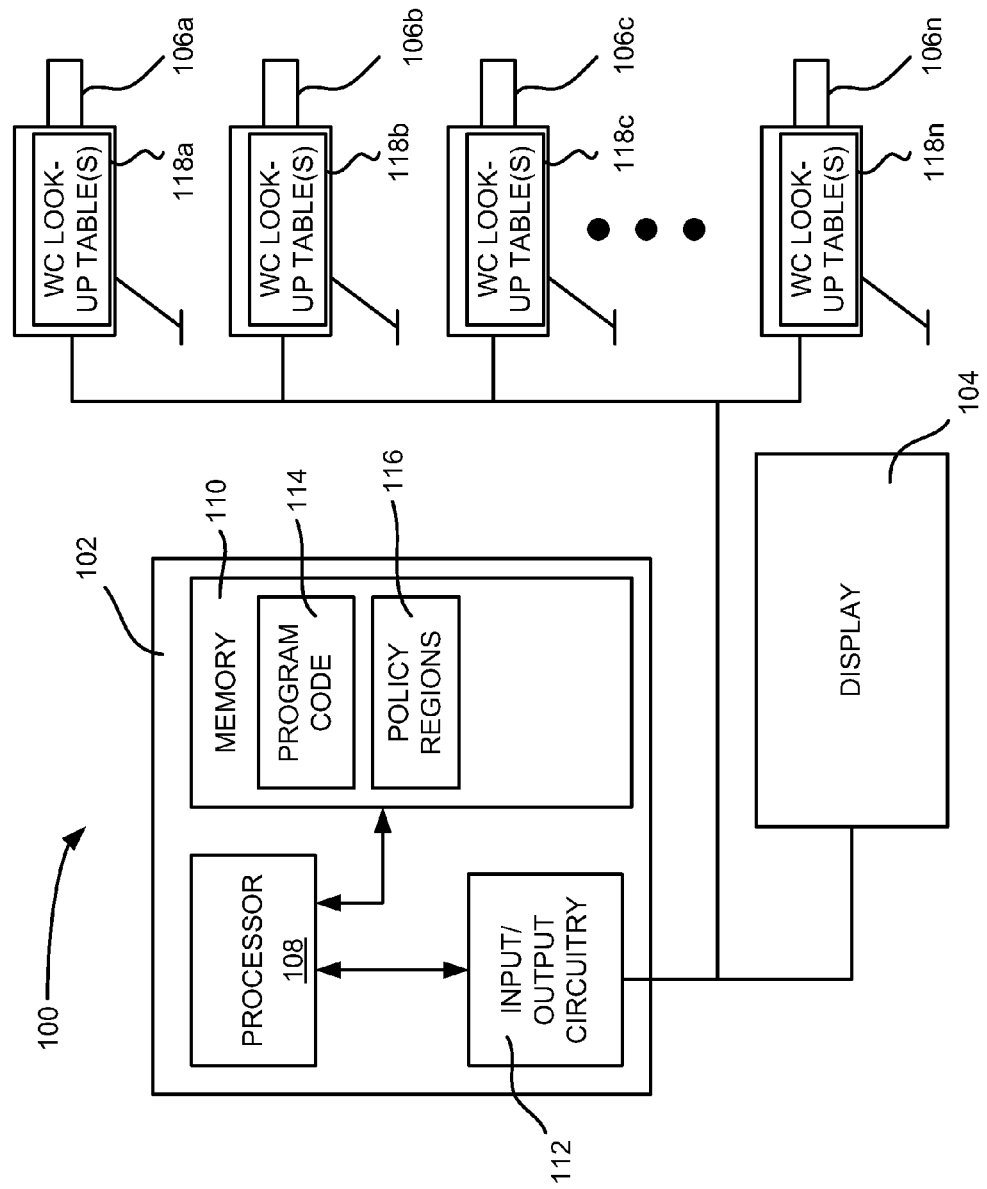
FIG. 1B is a schematic illustration of an alternative embodiment of the surveillance system of FIG. 1A provided in accordance with embodiments of the present invention.

FIG. 1B is a schematic illustration of an alternative embodiment of the surveillance system 100 of FIG. 1A provided in accordance with embodiments of the present invention. In the surveillance system 100 of FIG. 1A, one or more of sensors 106a-n may include its own world coordinate (WC) look-up table or database 118a-n so that image or other sensor data delivered to the controller 102 may be provided in world coordinates (e.g., rather than in pixel coordinates, for example).

Example operation of the surveillance system 100 is described below with reference to FIGS. 2A-13.

Figure 2A:
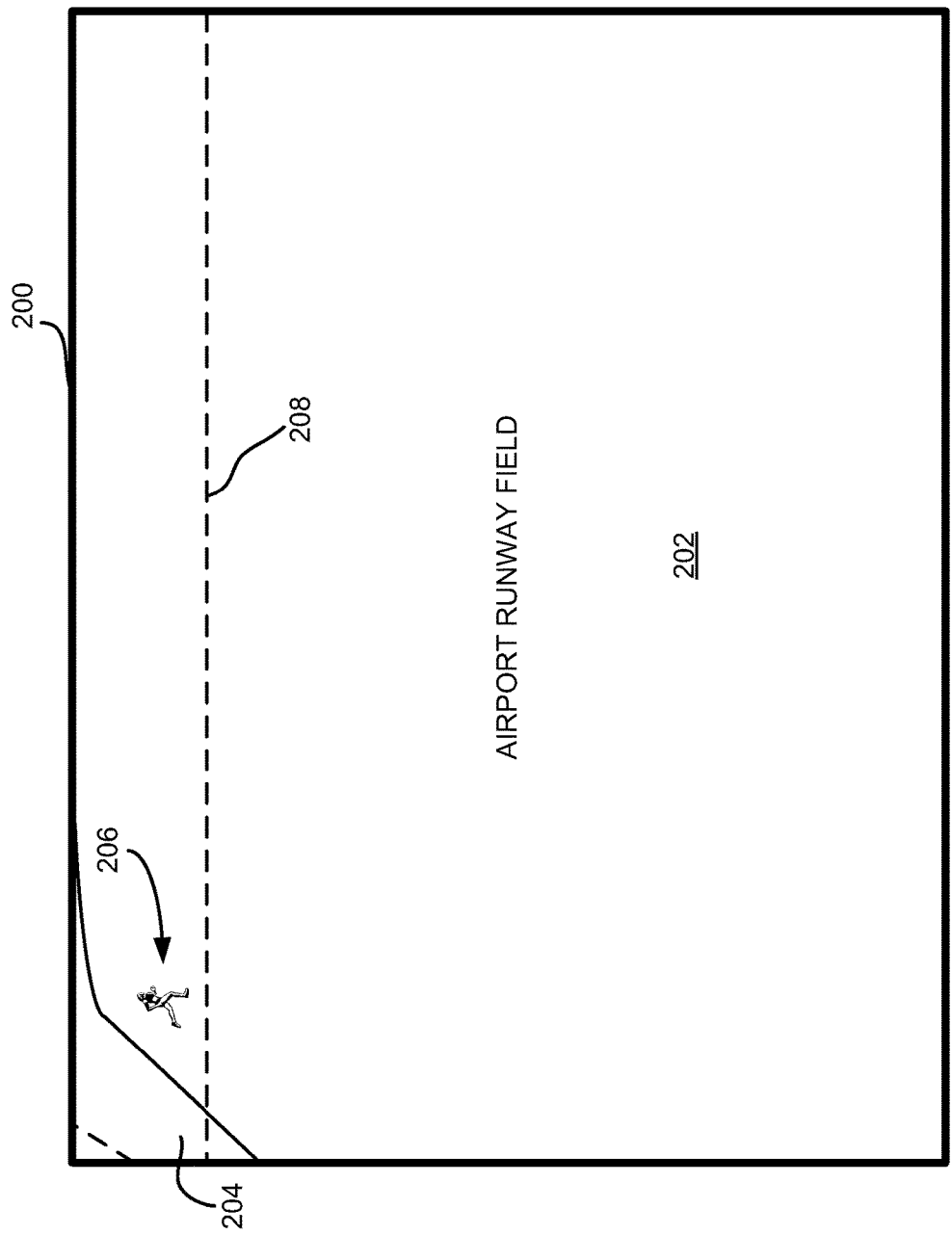
FIG. 2A is a schematic illustration of an example, first image from one of the sensors of FIG. 1A or 1B provided in accordance with embodiments of the present invention.

FIG. 2A is a schematic illustration of an example, first image 200 from one of the sensors 106a-n of FIG. 1A or 1B. The first image 200 is a screen shot of an airport runway field 202 having a portion of an airplane taxi lane 204 visible. Also present in first image 200 is a detected object 206 (e.g., a person) shown running across the airport runway field 202. A representation of a policy region 208 (shown in phantom) is overlaid on image 200 to illustrate the position of object 206 relative to the policy region 208 (as described further below).

Figure 2B:
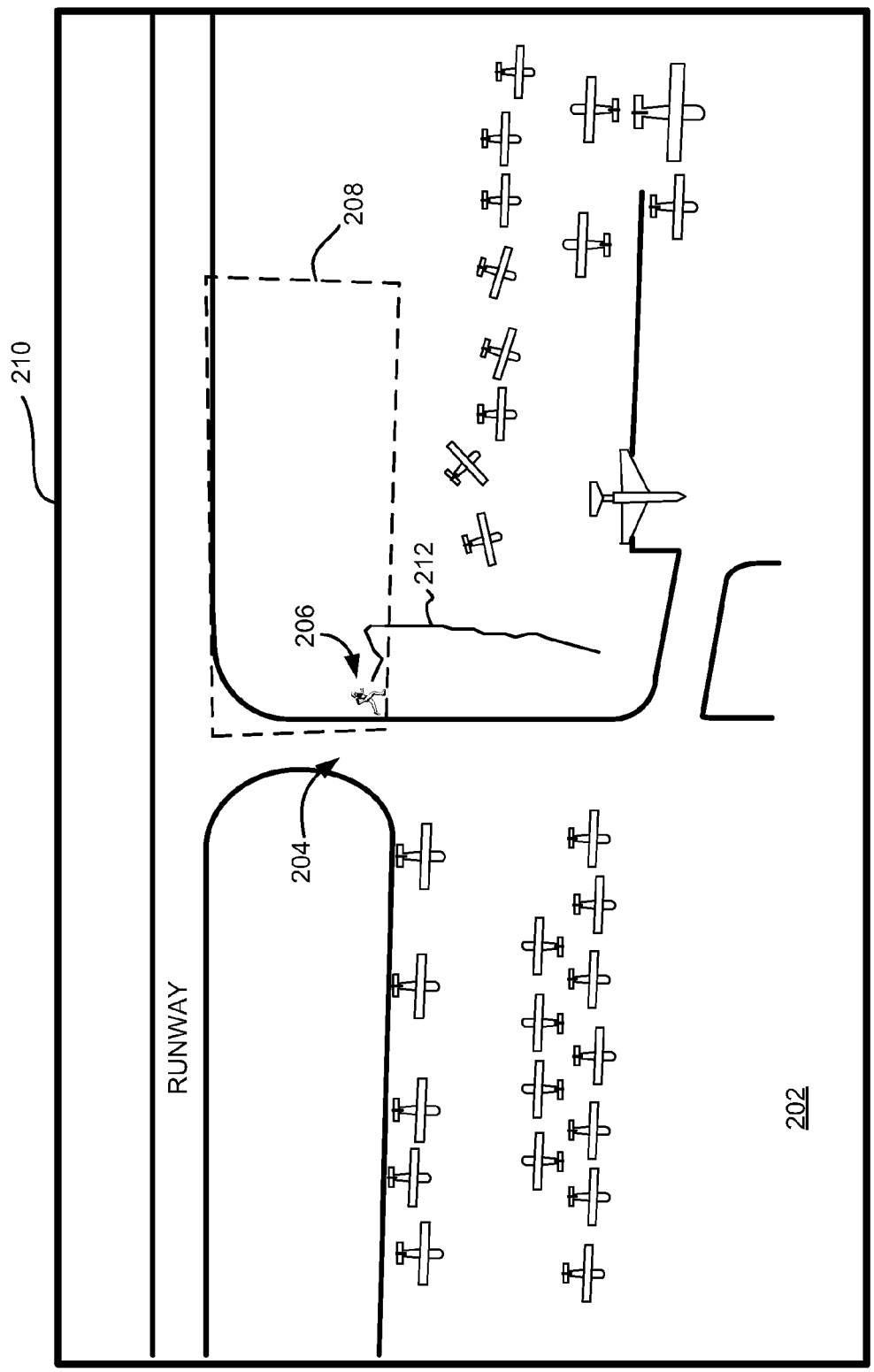
FIG. 2B is a schematic illustration of an example, first world view which displays an object in real world coordinates on a representation of the site the surveillance system of FIG. 1A or 1B is employed to monitor in accordance with embodiments of the present invention.

FIG. 2B is a schematic illustration of an example, first world view 210 which displays the object 206 in real world coordinates on a representation of the site the surveillance system 100 is employed to monitor. The world view 210 may include a map, one or pictures, direction information, coordinate information, site boundaries and/or other information useful for monitoring a location to be secured. The airport taxi lane 204, object 206 and policy region 208 are shown in the world image 210, in real world coordinates. Also shown are the airport runway, various airplanes, etc. A larger view, and in some embodiments the entire location being secured by the surveillance system 100 may be displayed.

As mentioned, information detected by sensors 106a-n of the surveillance system 100, such as the position of object 206 in first image 200, is converted into world coordinates for display on the world view 210. In some embodiments, other information regarding the object 206 may be obtained, converted to world coordinates and/or displayed on the world view 210 such as height, width, direction, travel route 212, any other two or three dimensional information, etc. The world view 210 may be a two dimensional or three dimensional view of the secure location.

As an example, assume that the first image 200 is from sensor 106a, Sensor 106a determines information about object 206 within the coordinate system used by the sensor 106a, In the example of a camera, the sensor 106a may determine the coordinates of each pixel in which the object 206 resides within first image 200. For a 320×240 pixel image, the lower left location in first image 200 would be (0,0), while the upper right location in the first image would be (319, 239). Higher or lower image resolutions may be employed.

The location of the object 206 in the world view 210 is determined by converting pixel coordinates from sensor 106a (or any other sensor employed) into world coordinates. As will be described further below, such pixel-to-world-coordinate mapping may be performed by controller 102 and/or by sensor 106a using world coordinate look-up table(s) 118. In general, any suitable algorithm for calculating world coordinates may be employed. In some embodiments, the world coordinates employed in world view 210 are UTM coordinates. UTM coordinates include a UTM zone number (1-60) and a coordinate pair which represents the north and east position within a UTM zone.

Figure 3A:
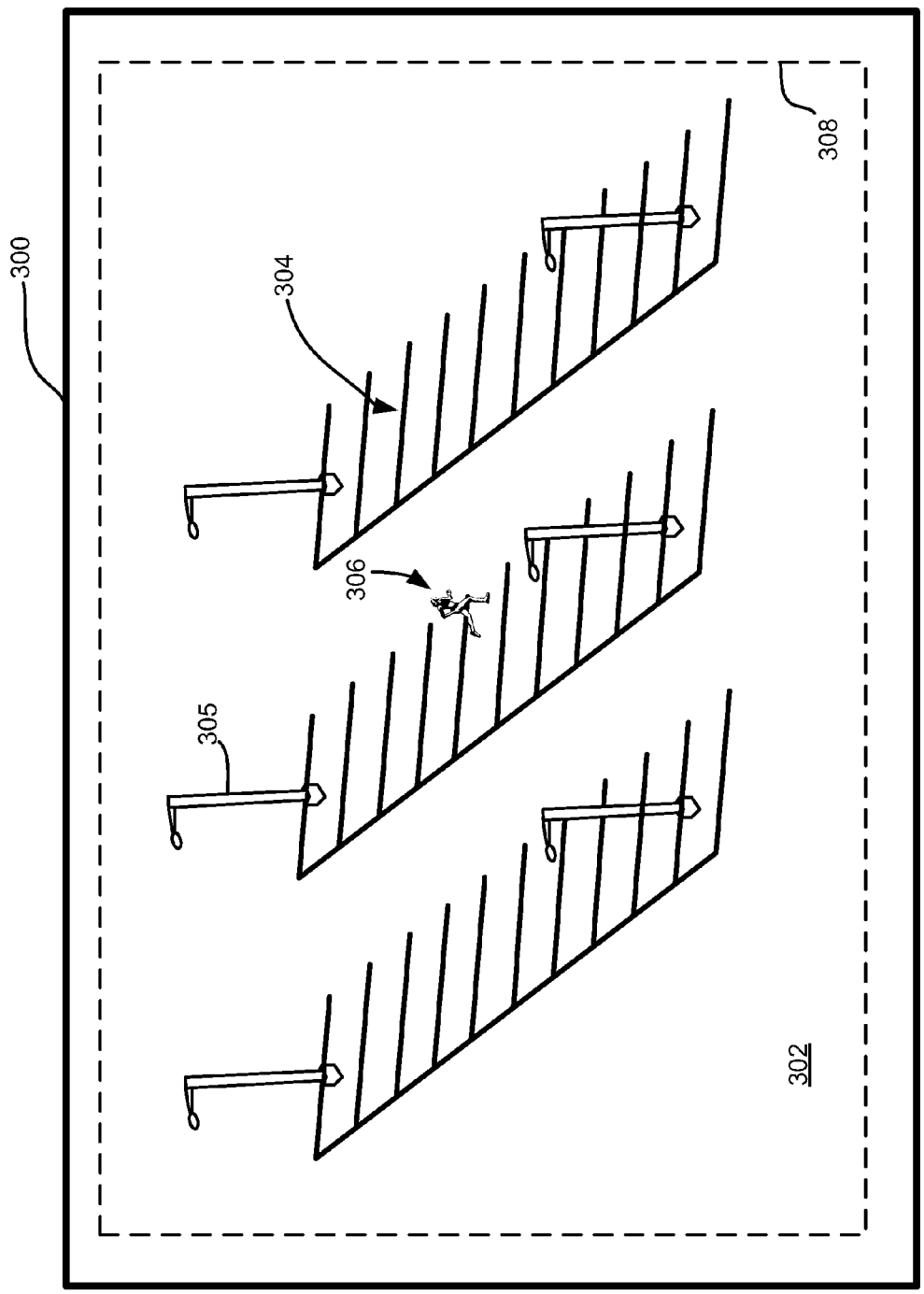
FIG. 3A is a schematic illustration of an example, second image from one of the sensors of FIG. 1A or 1B provided in accordance with embodiments of the present invention.

FIG. 3A is a schematic illustration of an example, second image 300 from one of the sensors 106a-n of FIG. 1A or 1B. The second image 300 is a screen shot of a commercial parking lot 302 having a portion of parking lanes 304 and lamp posts 305 visible. Also present in second image 300 is a detected object 306 (e.g., a person) shown running across the parking lot 302. A representation of a policy region 308 (shown in phantom) is overlaid on image 300 to illustrate the position of object 306 relative to the policy region 308 (as described further below).

Figure 3B:
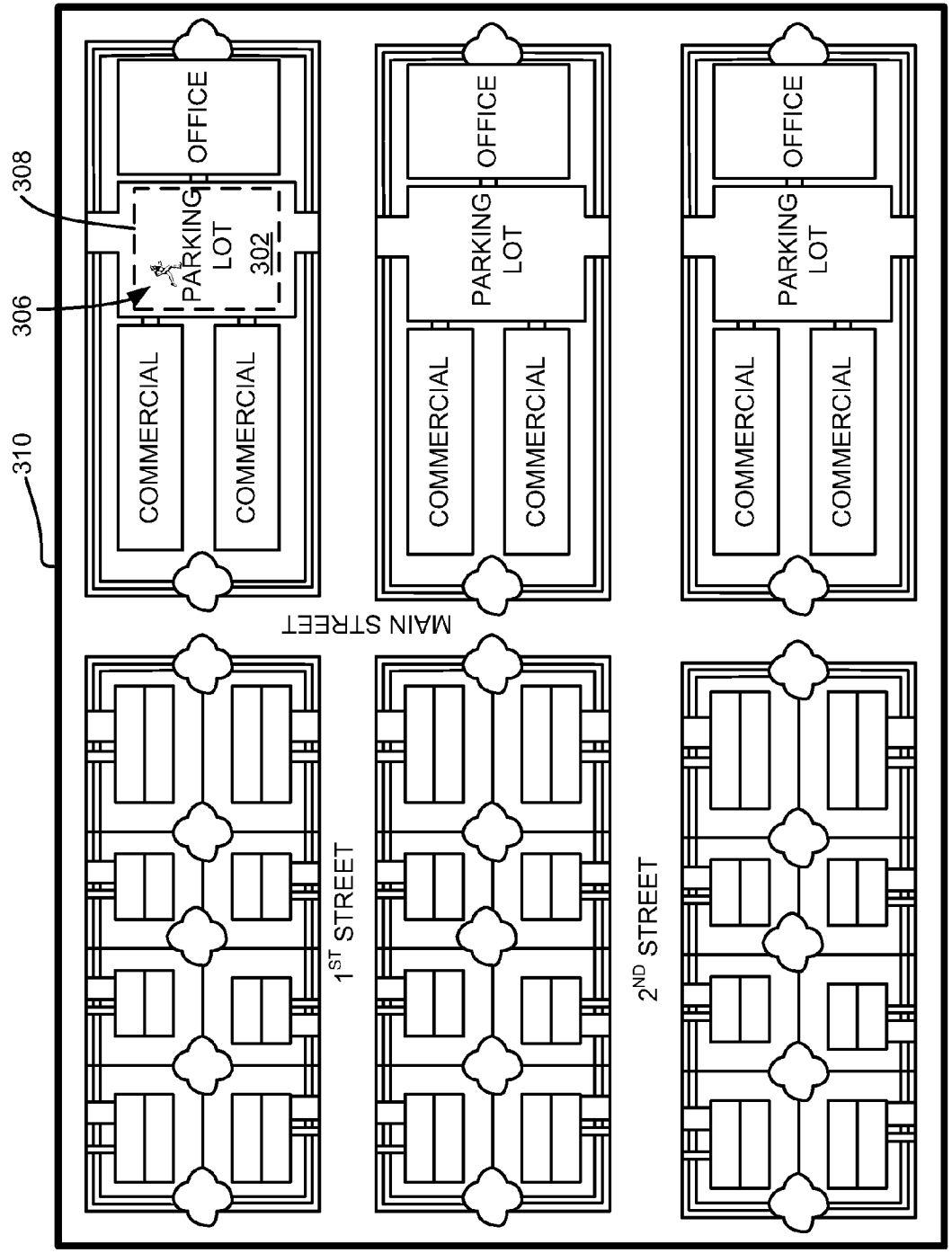
FIG. 3B is a schematic illustration of an example, second world view which displays an object in real world coordinates on a representation of the site the surveillance system of FIG. 1A or 1B is employed to monitor in accordance with embodiments of the present invention.

FIG. 3B is a schematic illustration of an example, second world view 310 which displays the object 306 in real world coordinates on a representation of the site the surveillance system 100 is employed to monitor (e.g., several city blocks). The world view 310 may include a map, one or pictures, direction information, coordinate information, site boundaries and/or other information useful for monitoring a location to be secured. The parking lot 302, object 306 and policy region 308 are shown in the world image 310, in real world coordinates. A larger view, and in some embodiments the entire location being secured by the surveillance system 100 is shown in FIG. 3B. For example, one or more commercial or office buildings, parking lots, driveways, sidewalks, city blocks, etc., may be displayed.

Figure 3C:
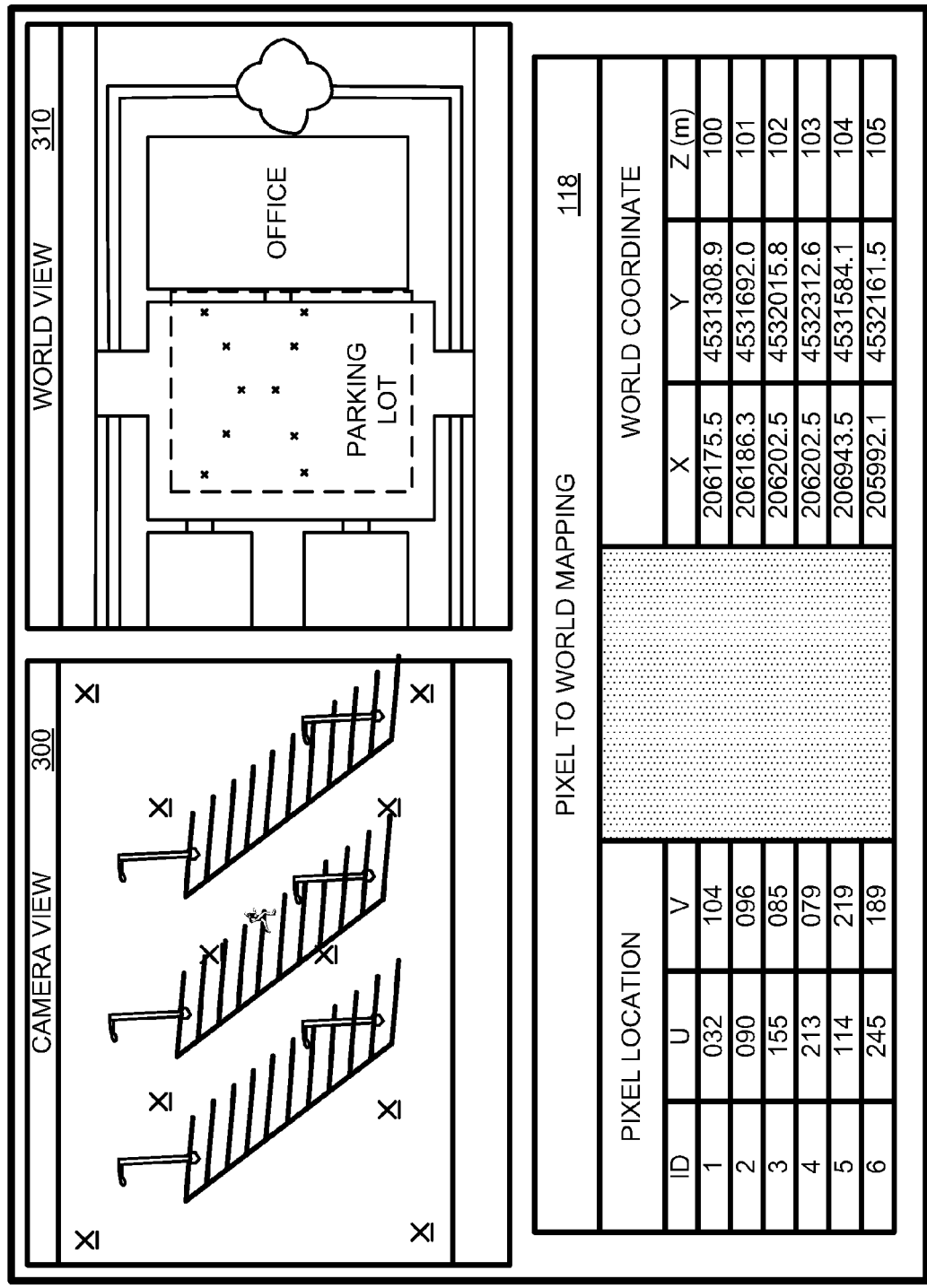
FIG. 3C illustrates an example graphical user interface (GUI) that may be employed for displaying a sensor image and corresponding world view in accordance with some embodiments of the invention.

FIG. 3C illustrates an example graphical user interface (GUI) 312 that may be employed for displaying sensor image 300 and corresponding world view 310 in accordance with some embodiments of the invention. Further, GUI 312 may be employed by a user to map pixel locations from sensor image 300 to coordinates in world view 310. In some embodiments, GUI 312 may be implemented via computer program code, such as program code 114, residing in memory 110 of controller 102. GUI 312 is merely representative and alternative user interfaces may be employed.

With reference to FIG. 3C, in some embodiments, a user may click on, highlight or otherwise select points or locations within the sensor image 300, as indicated by locations X in image 300, and click on, highlight or otherwise select corresponding locations within the world view 310, as indicated by locations X in world view 310. In this manner, locations from the sensor image 300 may be mapped to corresponding locations in the world view 310. In some embodiments, about 10 or more locations may be mapped between the sensor image 300 and world view 310. In general, fewer or more locations may be mapped.

Based on the mapped locations, the controller 102 may determine where each pixel location in the sensor image 300 resides in world view 310. For example, the controller 102 may generate a world coordinate look-up table 118 that provides a mapping of each pixel location within sensor image 300 into a corresponding world coordinate in world view 310. In this manner, upon detection of an object 306 within the sensor image 300, the controller 102 (and/or sensors 106a-n in the system of FIG. 1B) may determine a corresponding world coordinate location of the object 306 in world view 310. Likewise, as described further below, a user may select a policy region 308 within the world view 310 and the world coordinate look-up table(s) 118 may be employed to determine a location for an overlay representation of the policy region 308 within the sensor image 300. As stated, any suitable algorithm may be employed to convert pixel coordinates to world coordinates. In some embodiments, UTM coordinates are employed. However, other world coordinate systems may be used. An example surveillance system which employs world coordinates is the Siveillance SiteIQ system available from Siemens Switzerland Ltd of Gubelstrasse, Switzerland.

Policy regions of any shape or size may be established within a secure location. In some embodiments, policy regions may take the form of a polygon such as a triangle, square, rectangle, quadrilateral, pentagon, hexagon or any other closed shape. Policy regions may be implemented in one, two or three dimensions (e.g., x, y and/or z directions). Further, policy regions may span multiple sensors and/or may be used with multiple types of sensors (e.g., cameras, radar devices, GPS devices, etc.). Each policy region may include one or more alarm criterion that will trigger an alarm condition. In some embodiments, the alarm criterion may be to never generate an alarm. Examples of policy regions and alarm criterion are described below with reference to FIGS. 4A-13.

FIGS. 4A-4D are schematic illustrations of example embodiments of a secure location 400 which employs policy regions 402 and 404. Fewer or more policy regions may be employed. In the embodiments shown, the policy regions 402 and 404 are established within a world view image.

With reference to FIG. 4A, different policy regions may have the same or different alarm criteria (or criterion), such that policy region 402 may have the same or different alarm criteria which specify when an alarm should be triggered in comparison to policy region 404. For example, policy region 402 may be configured so that an alarm is triggered only when an object 406 enters policy region 402, whereas policy region 404 may be configured so that an alarm is triggered only when object 406 exits policy region 404. Other alarm criteria may be used for policy regions 402 and/or 404.

Policy regions may be combined and/or overlapped to form composite policy regions as shown in FIG. 4B. With reference to FIG. 4B, policy region 402 overlaps policy region 404, creating an overlapping region 408 and composite policy region 410. In some embodiments, the alarm criteria within the overlapping region 408 may be the same as that of policy region 402 or policy region 404, depending on user preference, for example. For example, the controller 102 may identify where the policy regions 402 and 404 overlap and may selectively ignore the portion of the boundary of policy region 402 or 404 that is within the overlapping region.

In other embodiments, both the alarm criteria for policy region 402 and policy region 404 may be applied to overlapping region 408.

In yet other embodiments, overlapping policy region 408 may have one or more alarm criterion that are different than the alarm criteria of the individual policy regions 402 and 404. For example, in some embodiments, overlapping policy region 408 may be configured so that object 406 (or any other object) does not trigger an alarm upon entry into and/or exit from overlapping region 408 regardless of the alarm criteria of policy region 402 and/or 404. In one such an embodiment, for example, the controller 102 may identify where the policy regions 402 and 404 overlap, ignore any alarm criteria of policy regions 402 and 404 in the overlap region, and create the overlapping policy region 408 as a new policy region with its own alarm criteria (or criterion).

Figure 4C:
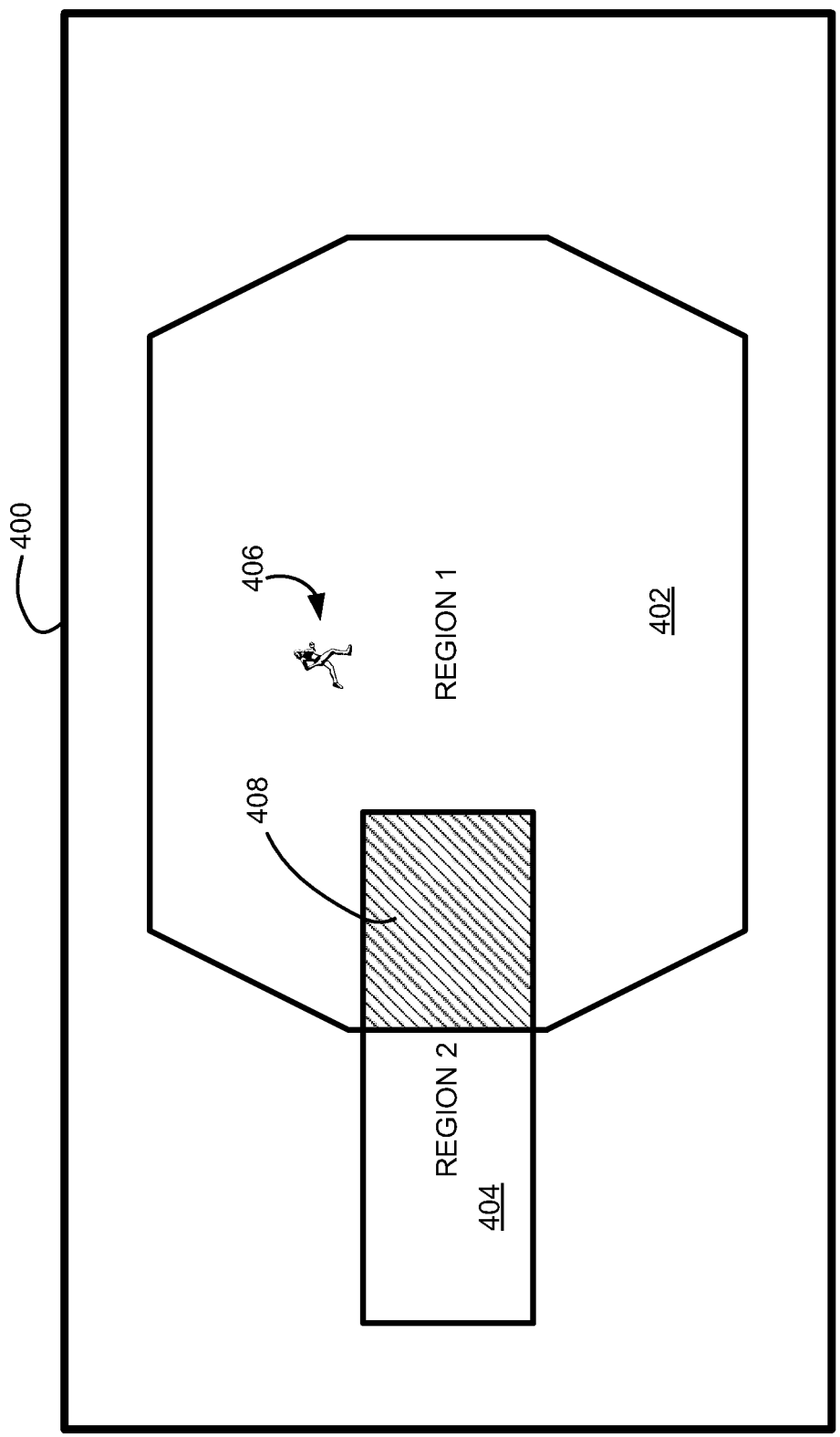

With reference to FIG. 4C, a safe entry zone for a secure location 400 may be established through proper selection of the alarm criteria for policy region 402, policy region 404 and overlapping policy region 408. One such configuration is as follows:

(1) the alarm criteria for policy region 402 are configured so that an alarm is triggered when an object such as object 406 enters or exits the policy region 402 (across the outside border of policy region 402), but not when an object moves within the policy region 402;

(2) the alarm criteria for policy region 404 are configured so that no alarm is triggered when an object such as object 406 enters, exits or moves within the policy region 404; and (3) the alarm criteria for overlapping policy region 404 are configured to be the same as for policy region 404.

In such an embodiment, when an object enters policy region 404, no alarm is triggered. The object may then travel through policy region 404 into policy region 402 (through policy region 404) without triggering an alarm in policy region 402 because the object enters through the overlapping region 408. Overlapping region 408 effectively overrides the alarm criteria of policy region 402 that would otherwise trigger an alarm as an object enters policy region 402. This is only true for the boundary of policy region 402 within the overlapping region 408.

If the object stays within policy region 402, or exits through policy region 404, no alarm will be triggered. If, however, an object enters policy region 402 or exits policy region 402 at any location other than through policy region 404/overlapping region 408, an alarm will be triggered. A safe entry into policy region 402 is therefore created by overlapping policy region 404 and policy region 402. Such a safe entry may be employed, for example, at a guard house or other secure check-in facility for a secure location.

Figure 4D:
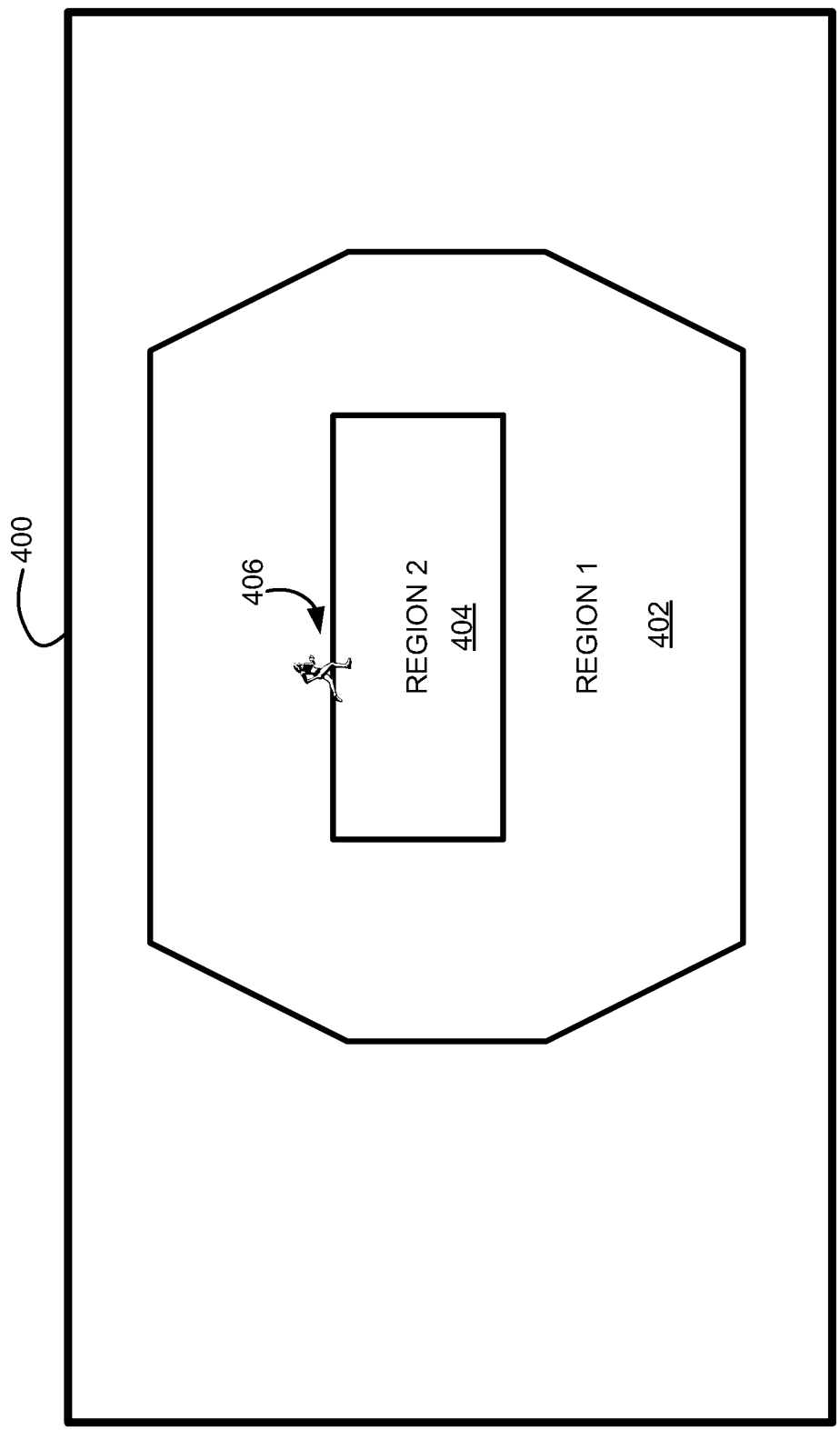

FIG. 4D illustrates the use of nested policy regions. As shown in FIG. 4D, policy region 404 resides completely within policy region 402. Such embodiments may allow the formation of escalating levels of protection. For example, policy region 402 may have alarm criteria that specify an object may enter the policy region 402 for a predetermined time period. If the object leaves the policy region 402 within the predetermined time period, no alarm is triggered. However, policy region 404 may have alarm criteria that immediately trigger an alarm if an object enters policy region 404. Therefore, policy regions may overlap, and/or create multiple levels of protection by being stacked on top of one another. In some embodiments, policy regions may be ranked, so that alarm criteria of higher priority policy regions such as policy region 404 override (or enhance) alarm criteria of lower priority policy regions such as policy region 402.

While only two policy regions are shown in FIGS. 4A-4D, it will be understood that any number of policy regions may be employed and/or any number of policy regions may overlap. Further, in some embodiments, policy regions may be established on a world view map or image of a secure location, such as world view 210 of FIGS. 2A-2B or world view 310 of FIGS. 3A-3C. In this manner, policy regions may be established without regard for which sensor or sensors 106*a-n* cover the policy regions, and policy regions may span multiple sensor detection regions (if desired). As stated, policy regions may span multiple sensor types.

FIGS. 5-13 illustrate example alarm criteria for policy regions provided in accordance with embodiments of the present invention. Other alarm criteria and/or policy regions may be provided.

Figure 5:
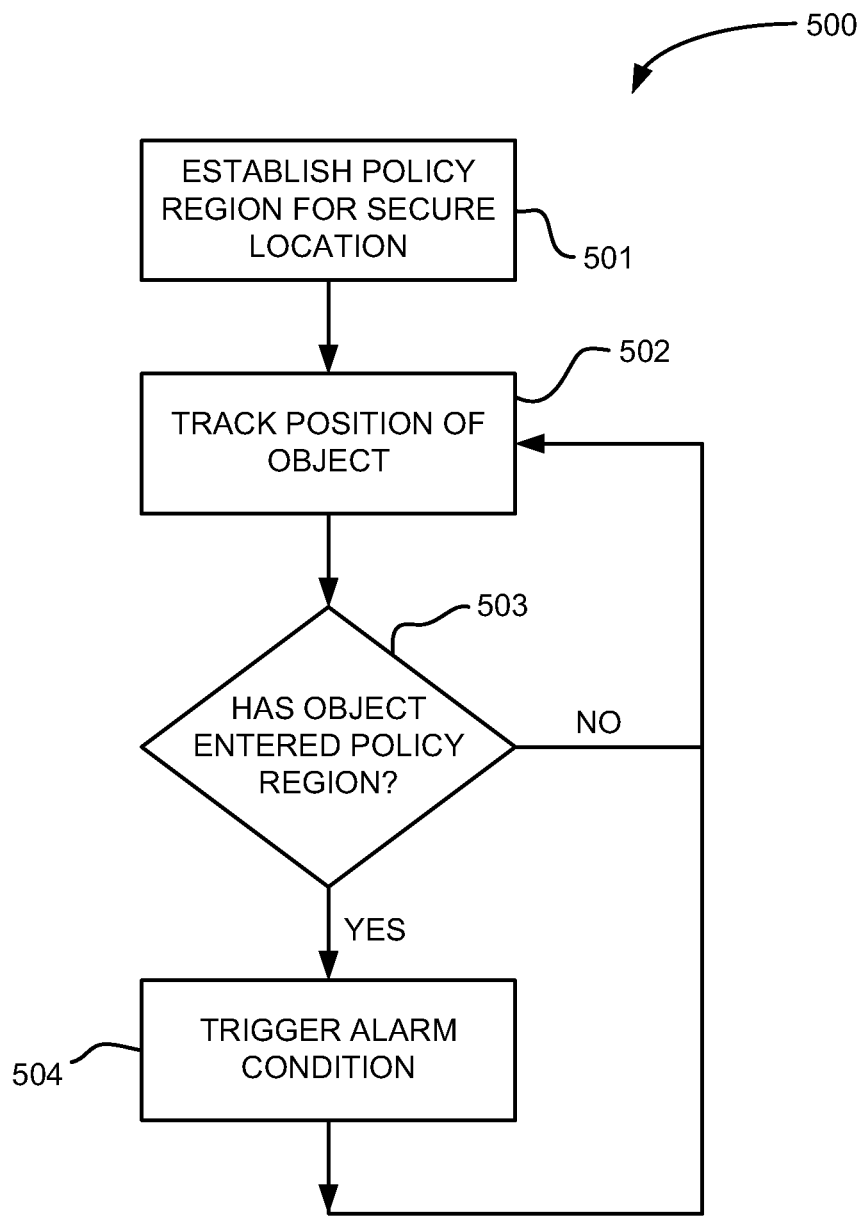
FIGS. 5-13 illustrate example alarm criteria for policy regions provided in accordance with embodiments of the present invention.

With reference to FIG. 5, a first method 500 provides alarm triggering when an object enters a policy region of a secure location. The first method 500 begins with Block 501 wherein the policy region is established for the secure location. For example, the location, size, shape and/or alarm criteria for the policy region may be selected by a user. In some embodiments, the user may establish the policy region on a world view of the secure location. In this manner, the policy region may be established without concern for the particular sensors 106*a-n* which monitor the policy region. For example, in the embodiment of FIG. 1A, the controller 102 may use a world coordinate look-up table(s) 118 or another algorithm to determine which sensors 106*a-n* may be employed for the policy region, and where the policy region will reside in the image of each sensor 106*a-n* employed for the policy region. In the embodiment of FIG. 1B, the controller 102 may work with the world coordinate tables of sensors 106*a-n* for this purpose.

In Block 502, the surveillance system 100 tracks the position of any objects within the secure location. In Block 503, the surveillance system 100 determines whether any object has entered the policy region. For example, if an object is detected by one or more of the sensors 106*a-n*, in the embodiment of FIG. 1A, the controller 102 may determine the pixel location(s) of the object and use the world coordinate look-table(s) 118 to determine if the object has crossed a boundary of the policy region and entered into the policy region. In the embodiment of FIG. 1B, world coordinate data of the object may be provided to the controller 102 from one or more of the sensors 106*a-n*. If in Block 503, the controller 102 determines that no object has entered the policy region, the method 500 returns to Block 502 to continue tracking the position of any objects within the secure location; otherwise, the controller 102 triggers an alarm at Block 504 indicating that an object has entered the policy region. The surveillance system 100 may continue tracking objects within the secure location.

Figure 6:
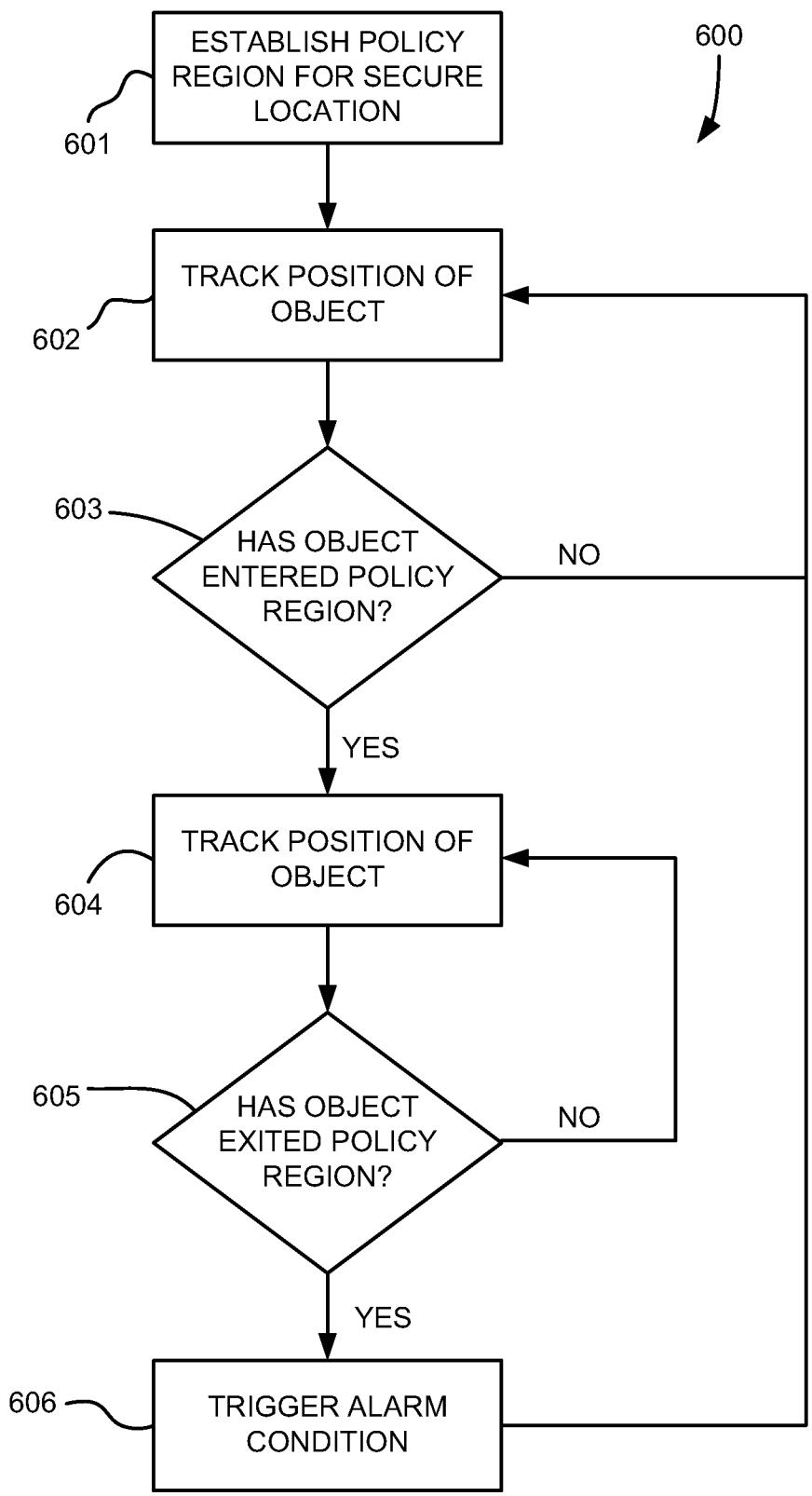

With reference to FIG. 6, a method 600 provides for alarm triggering when an object passes through or crosses a policy region of a secure location. The method 600 begins with Block 601 wherein a policy region is established for a secure location. For example, the location, size, shape and/or alarm criteria for the policy region may be selected by a user. In some embodiments, the user may establish the policy region on a world view of the secure location. In this manner, the policy region may be established without concern for the particular sensors 106*a-n* which monitor the policy region. As stated, the controller 102 may use one or more world coordinate look-up tables 118 within the controller 102 or sensors 106*a-n*, or another algorithm, to determine which sensors 106*a-n* may be employed for the policy region, and where the policy region will reside in the image of each sensor 106*a-n* employed for the policy region.

In Block 602, the surveillance system 100 tracks the position of any objects within the secure location. In Block 603, the surveillance system 100 determines whether any object has entered the policy region. For example, if an object is detected by one or more of the sensors 106*a-n*, the controller 102 may use the world coordinates of the object to determine if the object has crossed a boundary of the policy region and entered into the policy region. If in Block 603, the controller 102 determines that no object has entered the policy region, the method 600 returns to Block 602 to continue tracking the position of any objects within the secure location; otherwise, the controller 102 records that an object has entered the policy region and continues to track the position of the object at Block 604. In Block 605, the surveillance system 100 determines if the object has exited the policy region. If not, the surveillance system 100 continues to monitor the object while the object is within the policy region; otherwise, if the surveillance system 100 determines that the object has exited the policy region, in Block 606, the controller 102 triggers an alarm. The surveillance system 100 may continue tracking objects within the secure location.

In some embodiments, the method 600 may be employed to generate an alarm after an object enters from a first side of the policy region, passes through the policy region and exits from a second side of the policy region. The first and second sides may be opposite one another, next to one another or have any other spacial relationship. For example, with reference to FIG. 4A, method 600 may be employed to trigger an alarm if object 406 enters policy region 402 from the left side of policy region 402, passes through policy region 402 and exits from the right side of policy region 402. In one or more embodiments, the policy region may be a thin rectangle or similar shape so that an object may enter and then exit the policy region at nearly the same time and/or over a short distance.

In some scenarios, an object may already be present in a policy region and/or not tracked as it enters the policy region. For example, a car dealership may have a large vehicle inventory that is parked for an extended time period in a secure parking lot. The car dealership may only be interested in monitoring when vehicles leave the dealership, not when vehicles, such as customer vehicles, enter the dealership. In such cases, a more simplified method 700 (see FIG. 7) may be employed in place of the method 600 of FIG. 6.

Figure 7:
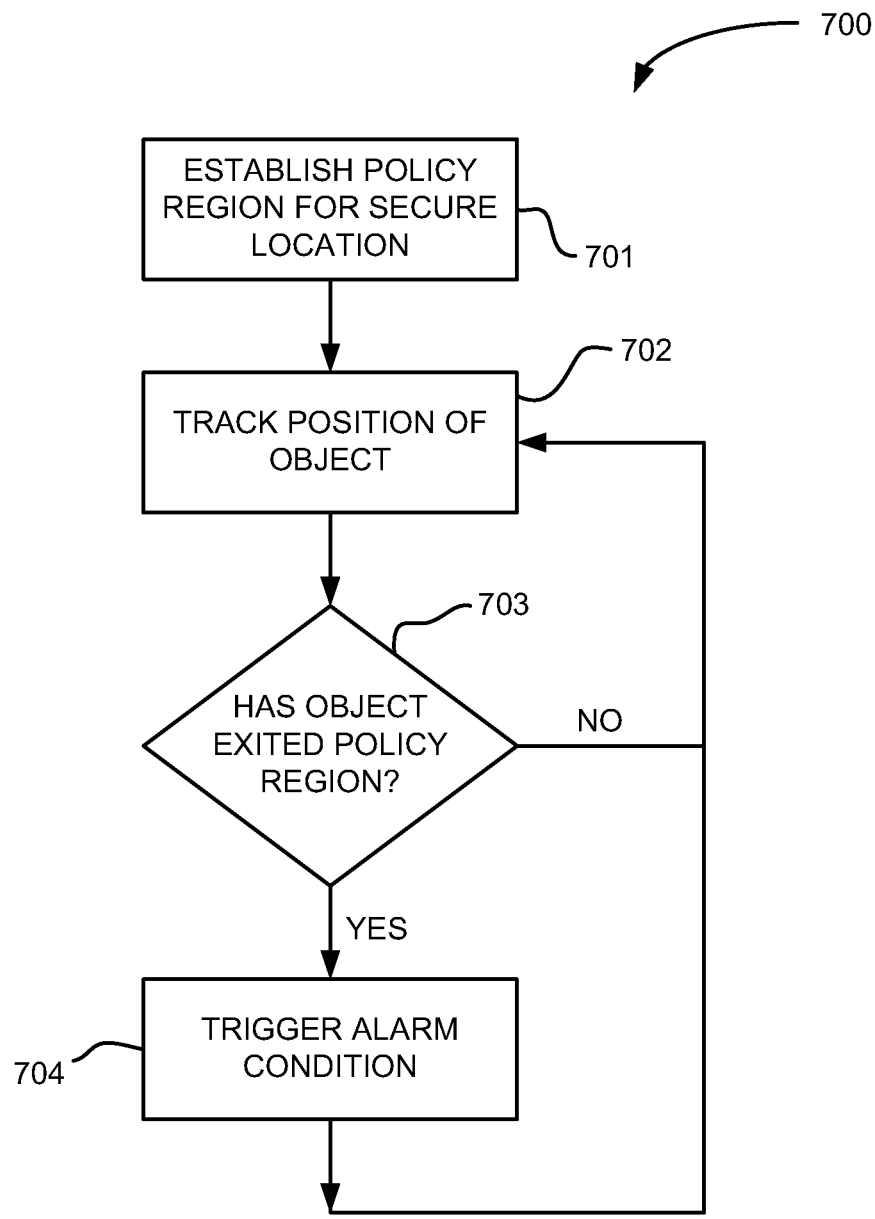

With reference to FIG. 7, the method 700 begins with Block 701 wherein the policy region is established for the secure location. In Block 702, the surveillance system 100 tracks the position of any objects within the secure location. In Block 703, the surveillance system 100 determines whether any object has exited the policy region. For example, if an object is detected by one or more of the sensors 106a-n, the controller 102 may use world coordinates of the object to determine if the object has crossed a boundary of the policy region and exited the policy region. If in Block 703, the controller 102 determines that no object has exited the policy region, the method 700 returns to Block 702 to continue tracking the position of any objects within the secure location; otherwise, the controller 102 triggers an alarm at Block 704 indicating that an object has exited the policy region. The surveillance system 100 may continue tracking objects within the secure location.

In some embodiments, it may be desirable to establish a policy region having alarm criteria that allow an object to exit a policy region without triggering an alarm, but trigger an alarm if the object re-enters the policy region. One such embodiment is shown in FIG. 8 as method 800.

Figure 8:
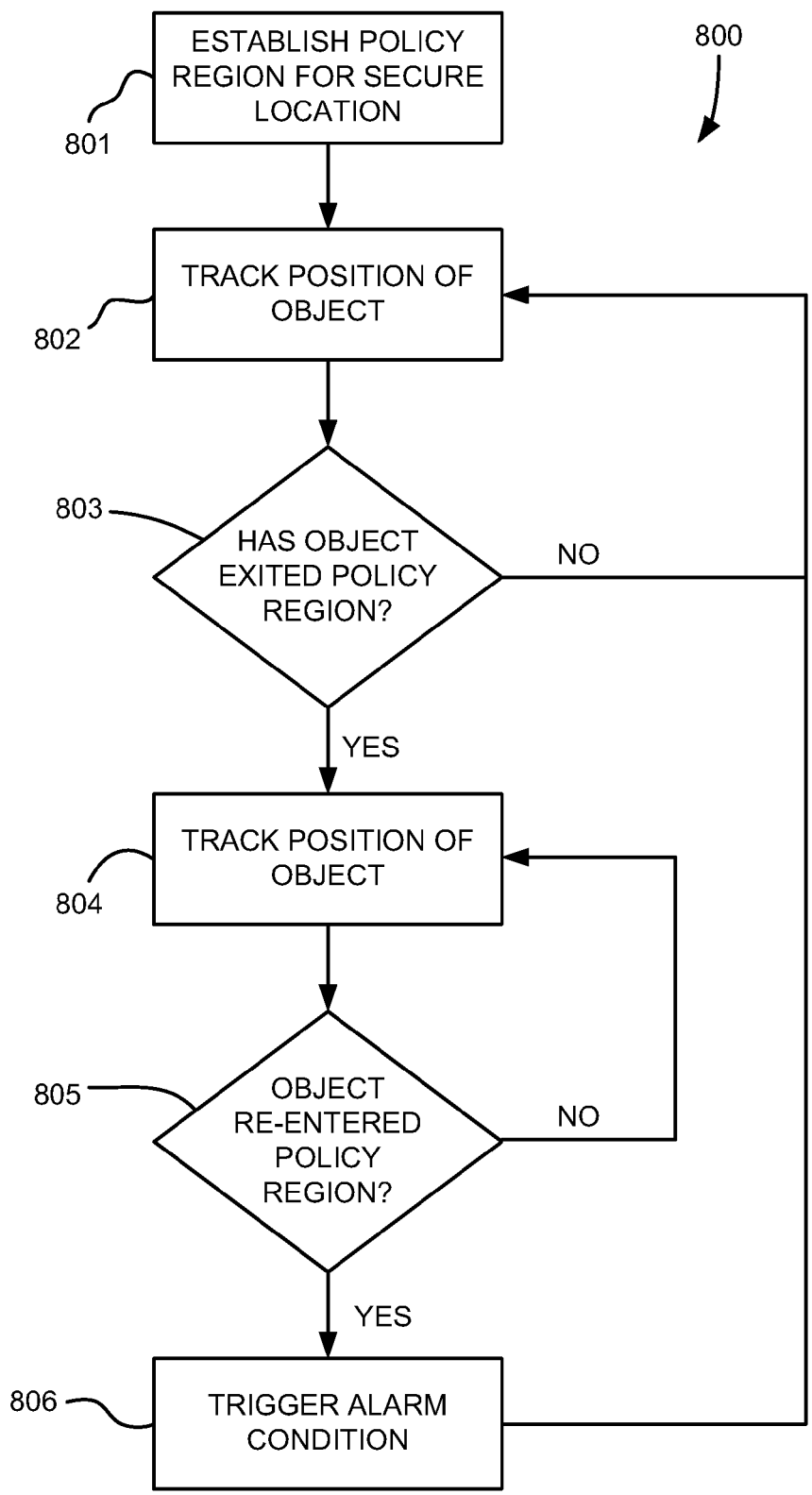

With reference to FIG. 8, the method 800 begins with Block 801 wherein a policy region is established for a secure location. For example, the location, size, shape and/or alarm criteria for the policy region may be selected by a user. In some embodiments, the user may establish the policy region on a world view of the secure location. In this manner, the policy region may be established without concern for the particular sensors 106a-n which monitor the policy region. As stated, the controller 102 may use one or more world coordinate look-up tables 118 within the controller 102 or sensors 106a-n, or another algorithm, to determine which sensors 106a-n may be employed for the policy region, and where the policy region will reside in the image of each sensor 106a-n employed for the policy region.

In Block 802, the surveillance system 100 tracks the position of any objects within the secure location. In Block 803, the surveillance system 100 determines whether any object has exited the policy region. For example, if an object is detected by one or more of the sensors 106a-n, the controller 102 may use the world coordinates of the object to determine if the object has crossed a boundary of the policy region and exited into the policy region. If in Block 803, the controller 102 determines that no object has exited the policy region, the method 800 returns to Block 802 to continue tracking the position of any objects within the secure location; otherwise, the controller 102 records that an object has exited the policy region and continues to track the position of the object at Block 804. In Block 805, the surveillance system 100 determines if the object has re-entered the policy region. If not, the surveillance system 100 continues to monitor the object while the object is within the policy region; otherwise, if the surveillance system 100 determines that the object has re-entered the policy region, in Block 806, the controller 102 triggers an alarm. The surveillance system 100 may continue tracking objects within the secure location.

Figure 9:
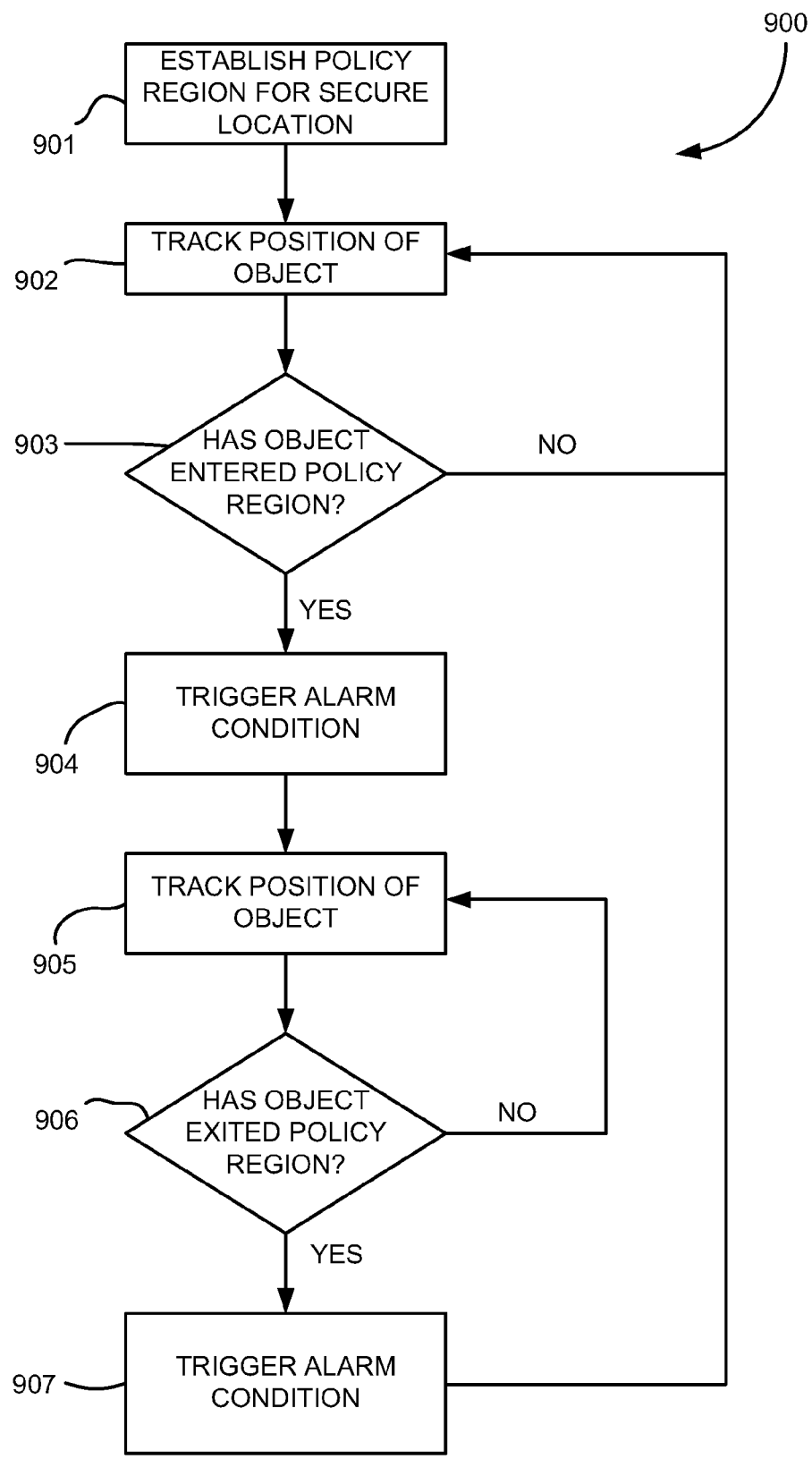

With reference to FIG. 9, a method 900 provides alarm triggering when an object enters or exits a policy region of secure location. With reference to FIG. 9, the method 900 begins with Block 901 wherein the policy region is established for a secure location. For example, the location, size, shape and/or alarm criteria for the policy region may be selected by a user. In some embodiments, the user may establish the policy region on a world view of the secure location so that the policy region may be established without concern for the particular sensors 106a-n which monitor the policy region.

In Block 902, the surveillance system 100 tracks the position of any objects within the secure location. In Block 903, the surveillance system 100 determines whether any object has entered the policy region. For example, if an object is detected by one or more of the sensors 106a-n, the controller 102 may use the world coordinates of the object to determine if the object has crossed a boundary of the policy region and entered into the policy region. If in Block 903, the controller 102 determines that no object has entered the policy region, the method 900 returns to Block 902 to continue tracking the position of any objects within the secure location; otherwise, the controller 102 generates an alarm at Block 904. In Block 905, the surveillance system 100 continues to track the position of the object that entered the policy region, and in Block 906, the controller 102 determines if the object has exited the policy region. If not, the surveillance system 100 continues to monitor the object while the object is within the policy region; otherwise, if the surveillance system 100 determines that the object has exited the policy region, in Block 907, the controller 102 triggers an alarm condition. The surveillance system 100 may continue tracking objects within the secure location. In general, any object may be tracked and an alarm may be generated any time an object enters or exits the policy region, regardless of where and/or when the object originated (e.g., whether the object originated outside or inside the policy region).

Figure 10:
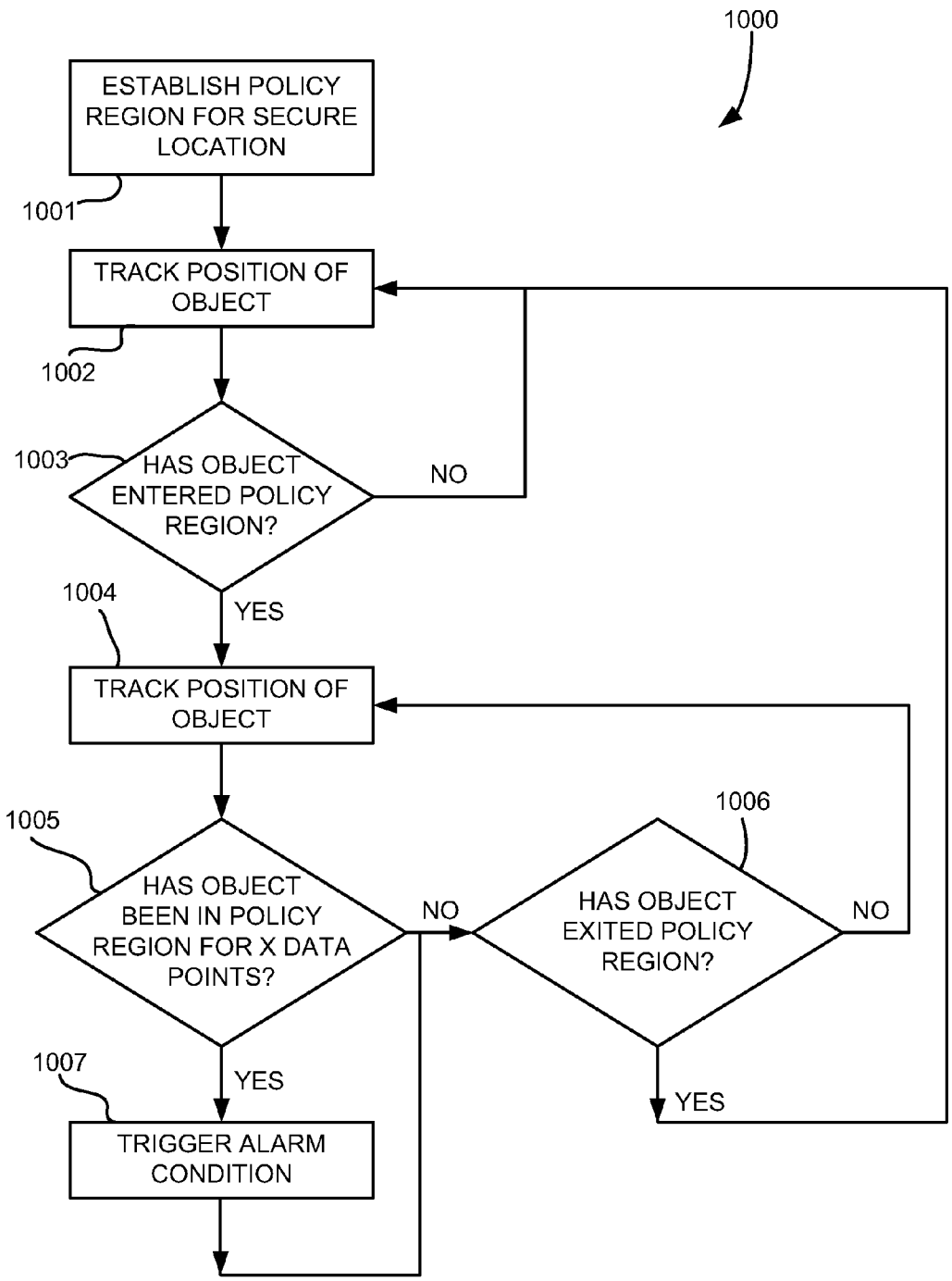

With reference to FIG. 10, a method 1000 provides alarm triggering when an object stays within a policy region of a secure location for a plurality of data points. For example, an alarm is not triggered until an object has been within a policy region for a predetermined amount of time, distance, direction of travel or the like. With reference to FIG. 10, the method 1000 begins with Block 1001 wherein the policy region is established for a secure location. For example, the location, size, shape and/or alarm criteria for the policy region may be selected by a user. In some embodiments, the user may establish the policy region on a world view of the secure location so that the policy region may be established without concern for the particular sensors 106a-n which monitor the policy region.

In Block 1002, the surveillance system 100 tracks the position of any objects within the secure location. In Block 1003, the surveillance system 100 determines whether any object has entered the policy region. For example, if an object is detected by one or more of the sensors 106a-n, the controller 102 may use the world coordinates of the object to determine if the object has crossed a boundary of the policy region and entered into the policy region. If in Block 1003, the controller 102 determines that no object has entered the policy region, the method 1000 returns to Block 1002 to continue tracking the position of any objects within the secure location; otherwise, having determined that the object is within the policy region, the controller 102 continues to track the object at Block 1004. Thereafter, at Block 1005 the controller 102 determines whether the object has been within the policy region for a predetermined number of data points. For example, the controller 102 may determine whether the object has been within the policy region for a predetermined time period, travelled a predetermined distance within the policy region, travelled in a predetermined direction or along a predetermined path within the policy region, any combination of the above, etc. If not, in Block 1006 the controller 102 determines whether object has left the policy region and proceeds to either Block 1002 if the object has left the policy region or to Block 1004 if the object has not left the policy region. If in Block 1005 the controller 102 determines that the object has been within the policy region for a predetermined number of data points, in Block 1007 an alarm is triggered. The surveillance system 100 may continue tracking objects within the secure location.

Figure 11:
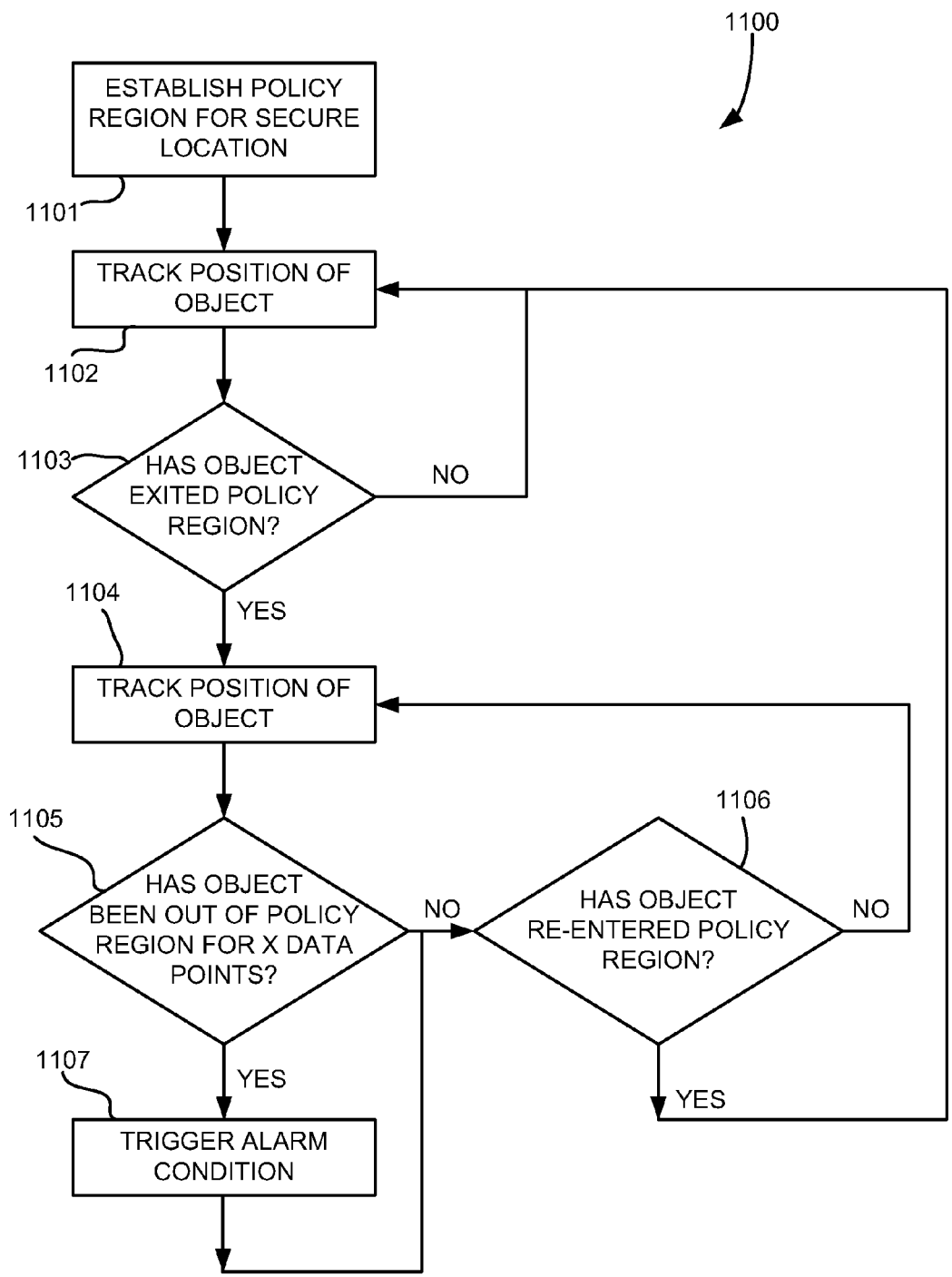

In one or more embodiments, a method similar to method 1000 may be employed to trigger an alarm when an object has been out of a policy region for a specified number of data points (e.g., a predetermined time period, travelled a predetermined distance outside of the policy region, travelled in a predetermined direction or along a predetermined path outside the policy region, any combination of the above, etc.). With reference to FIG. 11, a method 1100 begins with Block 1101 wherein the policy region is established for a secure location. For example, the location, size, shape and/or alarm criteria for the policy region may be selected by a user. In some embodiments, the user may establish the policy region on a world view of the secure location so that the policy region may be established without concern for the particular sensors 106a-n which monitor the policy region.

In Block 1102, the surveillance system 100 tracks the position of any objects within the secure location. In Block 1103, the surveillance system 100 determines whether any object has exited the policy region. For example, if an object is detected by one or more of the sensors 106a-n, the controller 102 may use the world coordinates of the object to determine if the object has crossed a boundary of the policy region and exited the policy region. If in Block 1103, the controller 102 determines that no object has exited the policy region, the method 1100 returns to Block 1102 to continue tracking the position of any objects within the secure location; otherwise, having determined that the object is outside of the policy region, the controller 102 continues to track the object at Block 1104. Thereafter, at Block 1105 the controller 102 determines whether the object has been outside the policy region for a predetermined number of data points. For example, the controller 102 may determine whether the object has been outside the policy region for a predetermined time period, travelled a predetermined distance outside of the policy region, travelled in a predetermined direction or along a predetermined path outside the policy region, any combination of the above, etc. If not, in Block 1106 the controller 102 determines whether object has re-entered the policy region and proceeds to either Block 1102 if the object has re-entered the policy region or to Block 1104 if the object has not re-entered the policy region. If in Block 1105 the controller 102 determines that the object has been outside the policy region for a predetermined number of data points, in Block 1107 an alarm is triggered. The surveillance system 100 may continue tracking objects within the secure location.

Figure 12:
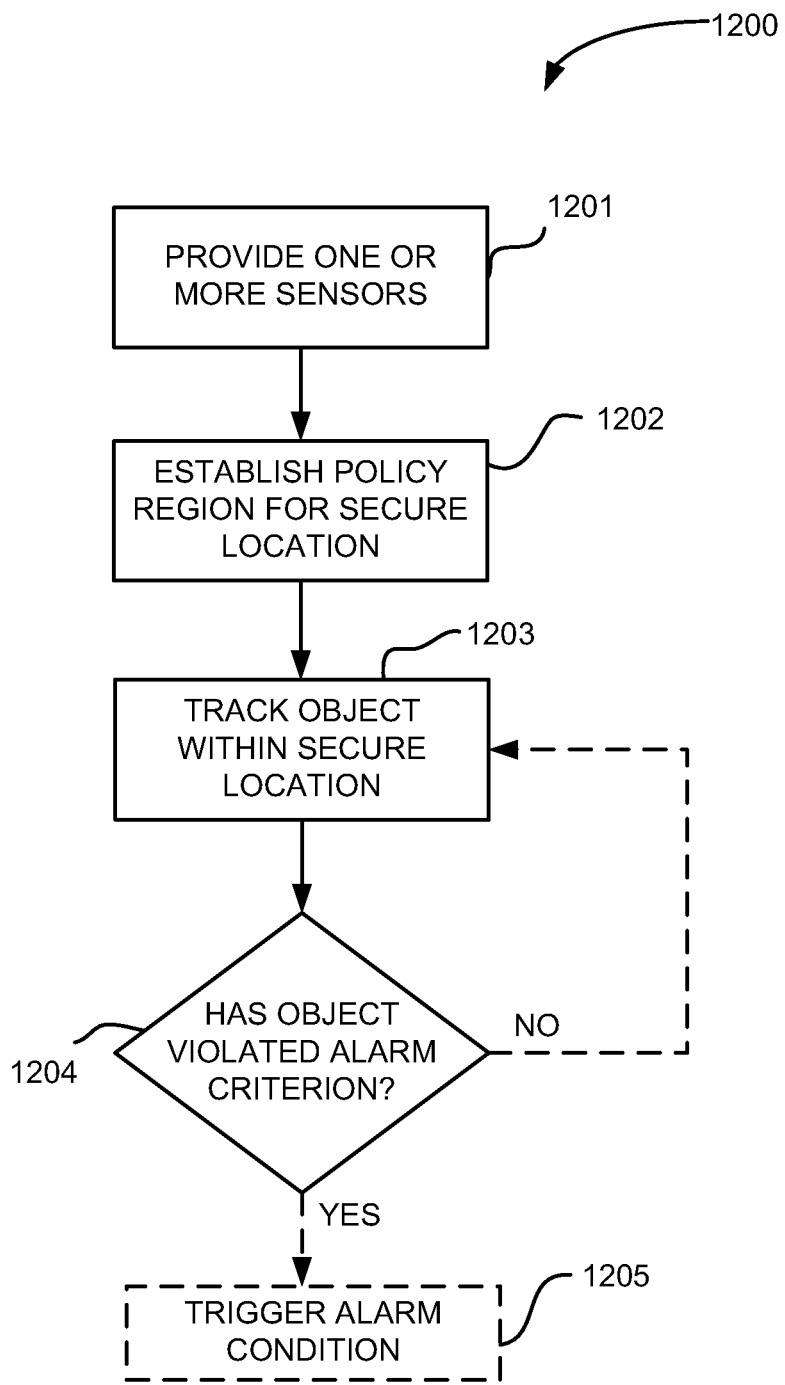

As described above, in some embodiments, numerous methods of monitoring a secure location may be provided. Another example method 1200 for monitoring a secure location is illustrated in FIG. 12. With reference to FIG. 12, in Block 1201 one or more sensors are provided that monitor the secure location, each sensor generating sensor data. In Block 1202, a policy region is established for the secure location employing world coordinates. The policy region establishes one or more alarm criterion for objects entering the policy region and/or for objects exiting the policy region. In Block 1203 an object is tracked within the secure location using the sensor data. In Block 1204, the controller 102 determines if the sensor data indicates that the object has violated one or more alarm criterion of the policy region (e.g., entered the or exited the policy region, entered and exited the policy region, entered or exited the policy region a predetermined number of data points, etc.). A positive determination may result in an alarm condition in some embodiments as shown in Block 1205 of FIG. 12.

Figure 13:
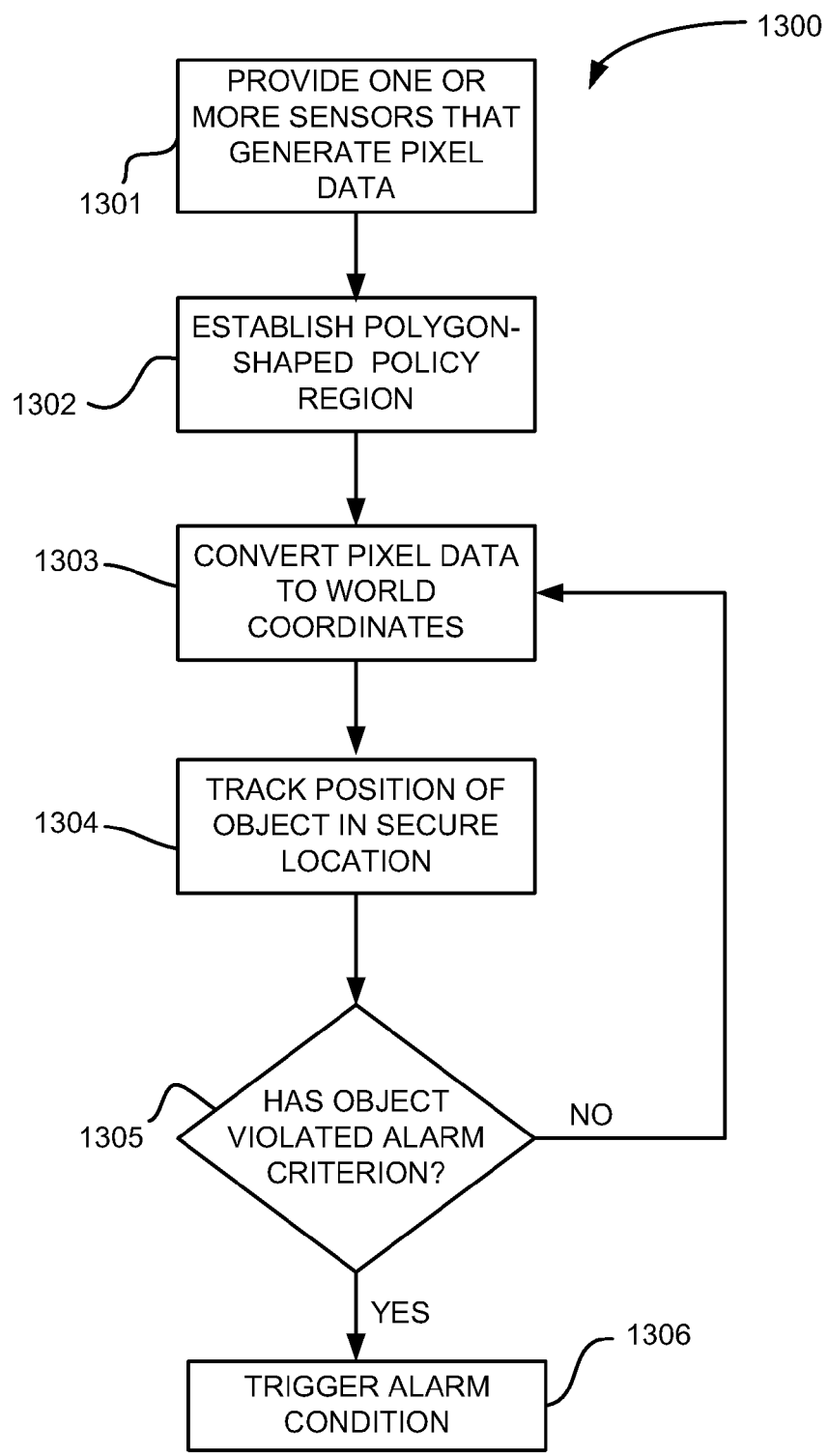

Yet another example method 1300 is illustrated in FIG. 13. With reference to FIG. 13, in Block 1301, one or more sensors are provided that monitor a secure location, each sensor generating pixel data. In Block 1302, a polygon-shaped policy region is established for the secure location employing world coordinates. The policy region establishes one or more alarm criterion for objects entering the policy region and/or for objects exiting the policy region. In Block 1303, pixel data from the one or more sensors is converted to world coordinate sensor data. In Block 1304, a position of an object is tracked within the secure location using the world coordinate sensor data. In Block 1305, the controller 102 determines if the world coordinate sensor data indicates that the object has violated one or more alarm criterion of the policy region. In Block 1306 an alarm is triggered if the world coordinate sensor data indicates that the object has violated one or more alarm criterion of the policy region.

The controller 102 may be configured to perform all or a portion of the above methods 500-1300, as well as the other methods described herein. For example, the controller 102 may employ computer program code to perform any portion of any of the methods described herein.

The foregoing description discloses only example embodiments of the invention. Modifications of the above disclosed apparatus and methods which fall within the scope of the invention will be readily apparent to those of ordinary skill in the art. For instance, an suitable alarm criteria may be used within a policy region such as object presence, object type, object state, object dimension, object orientation, object speed, direction of travel, distance travelled, time within a policy region, time outside a policy region, etc. Policy regions may be one, two or three dimensional, span multiple sensors and/or be employed with multiple types of sensors. Further, policy regions may overlap, be combined to form any desired shape or cover any desired region, and/or create multiple levels of protection by being stacked on top of one another. In some embodiments, policy regions may be ranked, so that alarm criteria of higher priority policy regions override alarm criteria of lower priority policy regions.

In some embodiments, the surveillance system 100 may track objects before, during and/or after an alarm is triggered, whether or not the objects are in policy regions. Objects may be tracked even while in safe entry locations (entry policy regions), such as policy region 404 in FIG. 4C.

Embodiments of the present invention may be employed for securing any location such as an airport, parking garage, car dealership, sports stadium, company headquarters, research facility or the like.

Accordingly, while the present invention has been disclosed in connection with example embodiments thereof, it should be understood that other embodiments may fall within the spirit and scope of the invention, as defined by the following claims.

The invention claimed is:

1. A method of monitoring a secure location comprising:
   providing one or more sensors that monitor the secure location, each sensor generating sensor data;
   establishing a plurality of policy regions for the secure location employing world coordinates, wherein at least two of the policy regions overlap and form an overlapping policy region, wherein each of the policy regions including the overlapping policy region respectively establishing one or more alarm criterion for at least one of objects entering the respective policy region and/or objects exiting the respective policy region;
   tracking an object within the secure location using the sensor data from the one or more sensors; and
   determining if the sensor data indicates that the object has violated one or more alarm criterion of the policy regions,
   wherein an alarm criterion of at least one of the policy regions causes:
      an alarm to be triggered if the object enters the a least one policy region but not if the object exits the at least one policy region;
      an alarm to be triggered if the object exits the policy region but not if the object enters the policy region; or
      an alarm to be triggered if the object enters the at least one policy region from a first side of the policy region and exits the policy region from a second side of the at least one policy region.

2. The method of claim 1 further comprising triggering an alarm if the received sensor data indicates that the object has violated the one or more alarm criterion of at least one of the policy regions.

3. The method of claim 1 further comprising converting sensor data from the one or more sensors to world coordinate sensor data.

4. The method of claim 1 wherein at least one of the policy regions is a polygon in shape.

5. The method of claim 1 wherein the one or more alarm criterion of at least one of the policy regions, cause an alarm to be triggered if the object enters the a least one policy region but not if the object exits the at least one policy region.

6. The method of claim 1 wherein the one or more alarm criterion of at least one of the policy regions, cause an alarm to be triggered if the object exits the policy region but not if the object enters the policy region.

7. The method of claim 1 wherein the one or more alarm criterion of at least one of the policy regions cause an alarm to be triggered if the object enters the at least one policy region from a first side of the policy region and exits the policy region from a second side of the at least one policy region.

8. The method of claim 1 wherein the one or more alarm criterion of at least one of the policy regions cause an alarm to be triggered if the object enters or exits the at least one policy region for a predetermined number of data points.

9. The method of claim 8 wherein the data points include at least one of time, distance and direction.

10. The method of claim 1 wherein at least one of the policy regions spans multiple sensors.

11. A method of monitoring a secure location comprising:
    providing one or more sensors that monitor the secure location, each sensor generating sensor data;
    establishing a plurality of policy regions for the secure location employing world coordinates, which policy regions respectively establish alarm criterion for objects entering and/or exiting the policy region, wherein at least two of the policy regions overlap and form an overlapping policy region, wherein the overlapping policy region creates a safe entry for one of the policy regions that establishes an alarm criterion for objects entering and/or exiting the policy region;
    tracking an object within the secure location using the sensor data from the one or more sensors; and
    determining if the sensor data indicates that the object has violated one or more alarm criterion of the policy regions.

12. A system for monitoring a secure location comprising:
    one or more sensors that monitor the secure location, each sensor generating sensor data; and
    a controller coupled to the one or more sensors, which controller includes a processor configured to:
       receive sensor data from the one or more sensors;
       allow a user to establish a plurality of policy regions for the secure location employing world coordinates, wherein at least two of the policy regions overlap and form an overlapping policy regions, wherein each of the policy regions including the overlapping policy regions respectively establishing one or more alarm criterion for at least one of objects entering the respective policy region and/or objects exiting the respective policy region;
       track an object within the secure location using the received sensor data; and determining if the received sensor data indicates that the object has violated one or more alarm criterion of the policy regions, wherein an alarm criterion of at least one of the policy regions causes:

an alarm to be triggered if the object enters the at least one policy region but not if the object exits the at least one policy region;

an alarm to be triggered if the object exits the at least one policy region but not if the object enters the at least one policy region; or an alarm to be triggered if the object enters the at least one policy region from a first side of the at least one policy region and exits the at least one policy region from a second side of the at least one policy region.

13. The system of claim 12 wherein the one or more sensors provide sensor data to the controller in world coordinates.

14. The system of claim 12 wherein the processor is configured to convert sensor data from the one or more sensors into world coordinates.

15. The system of claim 12 wherein the one or more alarm criterion of at least one of the policy regions cause an alarm to be triggered if the object enters the at least one policy region but not if the object exits the at least one policy region.

16. The system of claim 12 wherein the one or more alarm criterion of at least one of the policy regions cause an alarm to be triggered if the object exits the at least one policy region but not if the object enters the at least one policy region.

17. The system of claim 12 wherein the one or more alarm criterion of at least one of the policy regions cause an alarm to be triggered if the object enters the at least one policy region from a first side of the at least one policy region and exits the at least one policy region from a second side of the at least one policy region.

18. The system of claim 12 wherein the one or more alarm criterion of at least one of the policy regions cause an alarm to be triggered if an object enters or exits the at least one policy region for a predetermined number of data points.

19. The system of claim 12 wherein at least one of the policy regions spans multiple sensors.

20. A method of monitoring a secure location comprising:
providing one or more sensors that monitor the secure location, each sensor generating pixel data;

establishing a plurality of polygon-shaped policy regions for the secure location employing world coordinates, wherein at least two of the policy regions overlap and form an overlapping policy regions, wherein each of the policy regions including the overlapping policy regions respectively establishing one or more alarm criterion for at least one of objects entering the policy region and/or at least one of objects exiting the policy region;

converting pixel data from the one or more sensors to world coordinate sensor data; tracking a position of an object within the secure location using the world coordinate sensor data;

determining if the world coordinate sensor data indicates that the object has violated one or more alarm criterion of the policy regions; and triggering an alarm if the world coordinate sensor data indicates that the object has violated the one or more alarm criterion of the policy regions.

21. A system for monitoring a secure location comprising:
one or more sensors that monitor the secure location, each sensor generating world coordinate sensor data; and a controller coupled to the one or more sensors, which controller includes a processor configured to:

allow a user to establish a plurality of polygon-shaped policy regions for the secure location employing world coordinates, which policy regions respectively establish alarm criterion for objects entering and/or exiting the policy region, wherein at least two of the policy regions overlap and form an overlapping policy region, wherein the overlapping policy region creates a safe entry for one of the policy regions that establishes an alarm criterion for objects entering and/or exiting the policy region;

track a position of an object within the secure location using the world coordinate sensor data;

determine if the world coordinate sensor data indicates that the object has violated one or more alarm criterion of the policy regions; and trigger an alarm if the world coordinate sensor data indicates that the object has violated the one or more alarm criterion of the policy regions.

* * * * *